US010422397B1

(12) United States Patent
McKnight et al.

(10) Patent No.: US 10,422,397 B1
(45) Date of Patent: Sep. 24, 2019

(54) METHODS TO DYNAMICALLY ALTER THE STIFFNESS OF NONLINEAR STRUCTURES

(71) Applicant: HRL Laboratories, LLC, Malibu, CA (US)

(72) Inventors: Geoffrey P. McKnight, Los Angeles, CA (US); Christopher B. Churchill, Ventura, CA (US); Christopher P. Henry, Thousand Oaks, CA (US)

(73) Assignee: HRL Laboratories, LLC, Malibu, CA (US)

(*) Notice: Subject to any disclaimer, the term of this patent is extended or adjusted under 35 U.S.C. 154(b) by 11 days.

(21) Appl. No.: 14/214,242

(22) Filed: Mar. 14, 2014

Related U.S. Application Data

(60) Provisional application No. 61/800,827, filed on Mar. 15, 2013.

(51) Int. Cl.
F16F 1/14 (2006.01)
F16F 1/02 (2006.01)
F16F 1/32 (2006.01)
F16F 1/26 (2006.01)
F16F 1/22 (2006.01)
F16F 3/02 (2006.01)
F16F 3/00 (2006.01)

(52) U.S. Cl.
CPC ............... F16F 1/027 (2013.01); F16F 1/22 (2013.01); F16F 1/26 (2013.01); F16F 1/322 (2013.01); F16F 1/324 (2013.01); F16F 3/00 (2013.01); F16F 2224/0258 (2013.01); F16F 2224/0283 (2013.01); F16F 2228/063 (2013.01); F16F 2228/066 (2013.01)

(58) Field of Classification Search
CPC ...... F16F 1/027; F16F 1/22; F16F 1/26; F16F 1/322; F16F 1/324; F16F 3/00; F16F 2224/0258; F16F 2224/0283; F16F 2228/063; F16F 2228/066
USPC .................................................. 267/158–162
See application file for complete search history.

(56) References Cited

U.S. PATENT DOCUMENTS 3,814,470 A * 6/1974 Kicher .................... B60R 19/26 188/268
4,806,815 A * 2/1989 Honma ................ H01H 71/145 310/307
5,178,357 A 1/1993 Platus
5,310,157 A 5/1994 Platus
(Continued)

FOREIGN PATENT DOCUMENTS

DE 3637102 A1 * 5/1988

OTHER PUBLICATIONS

Alabuzhev et al., "Vibration Protecting and Measuring Systems with Quasi-Zero Stiffness," Hemisphere Publishing Corp., 56 pages, 1989.

(Continued)

Primary Examiner — Melody M Burch
(74) Attorney, Agent, or Firm — Lewis Roca Rothgerber Christie, LLP

(57) ABSTRACT

A variable stiffness structure configured to isolate a mass from unwanted vibrations includes a negative stiffness element and an actuator operatively coupled to the negative stiffness element. The actuator is configured to be actuated to control a stiffness of the negative stiffness element. The variable stiffness structure may also include a positive stiffness element coupled to the negative stiffness element.

22 Claims, 12 Drawing Sheets

(56) References Cited

U.S. PATENT DOCUMENTS

| | | | | |
|---|---|---|---|---|
| 5,669,594 | A | | 9/1997 | Platus et al. |
| 5,750,894 | A | * | 5/1998 | Russell ............... G01H 13/00 73/581 |
| 5,794,909 | A | | 8/1998 | Platus et al. |
| 5,978,720 | A | * | 11/1999 | Hieronymus ........ A01D 41/127 340/438 |
| 6,321,887 | B1 | * | 11/2001 | Kurusu ............... B60G 17/018 188/266.2 |
| 8,132,773 | B1 | | 3/2012 | Platus |
| 8,232,858 | B1 | * | 7/2012 | Garcia ................ B81B 3/0024 337/333 |
| 8,584,456 | B1 | | 11/2013 | McKnight |
| 2001/0037538 | A1 | * | 11/2001 | Duperray ............ B25J 17/0241 16/225 |
| 2008/0307786 | A1 | * | 12/2008 | Hafez .................. F03G 7/065 60/527 |
| 2013/0082427 | A1 | * | 4/2013 | Zavattieri ............ F16F 3/02 267/159 |
| 2014/0117600 | A1 | * | 5/2014 | Hawkins ............. F16F 1/3615 267/140.11 |

OTHER PUBLICATIONS

U.S. Appl. No. 14/195,569 entitled: Short-Beam Negative Stiffness Elements, filed Mar. 3, 2014.

\* cited by examiner

WHEN K2=K1, EFFECTIVE STIFFNESS APPROACHES 0

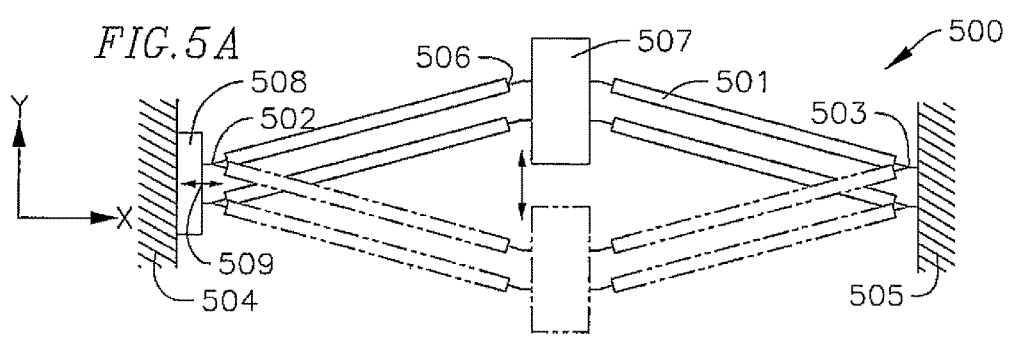
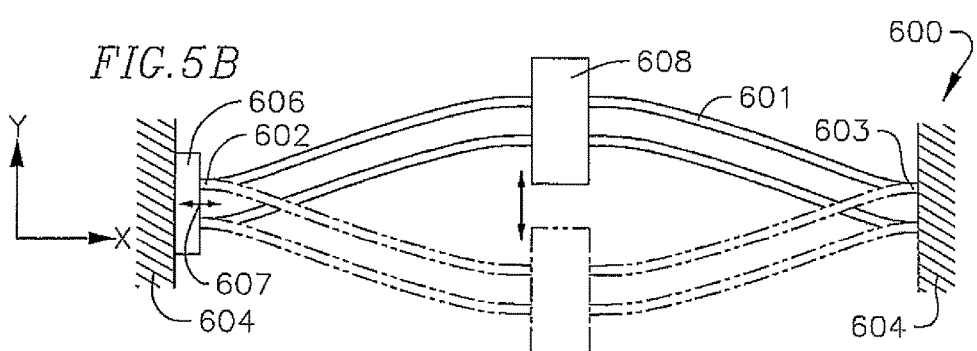
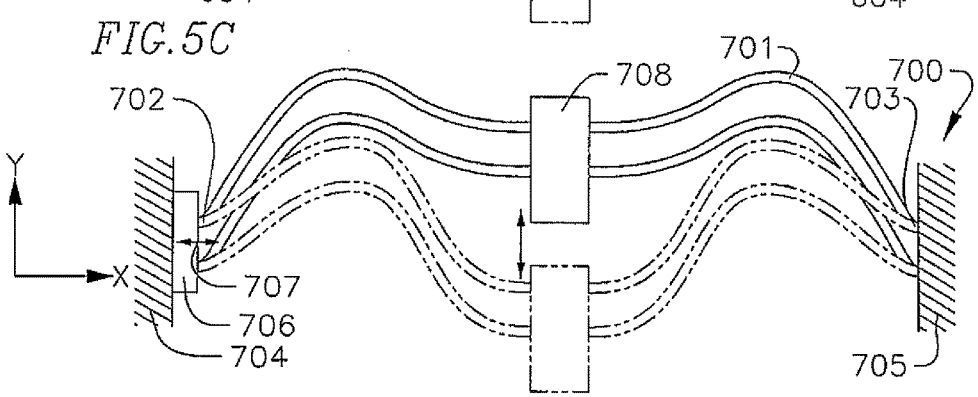
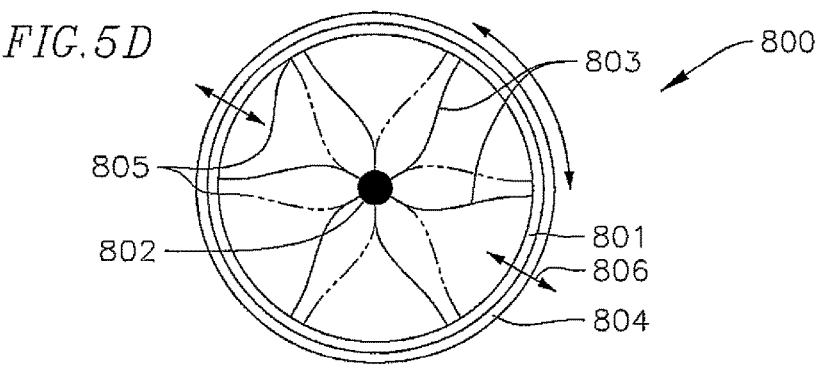

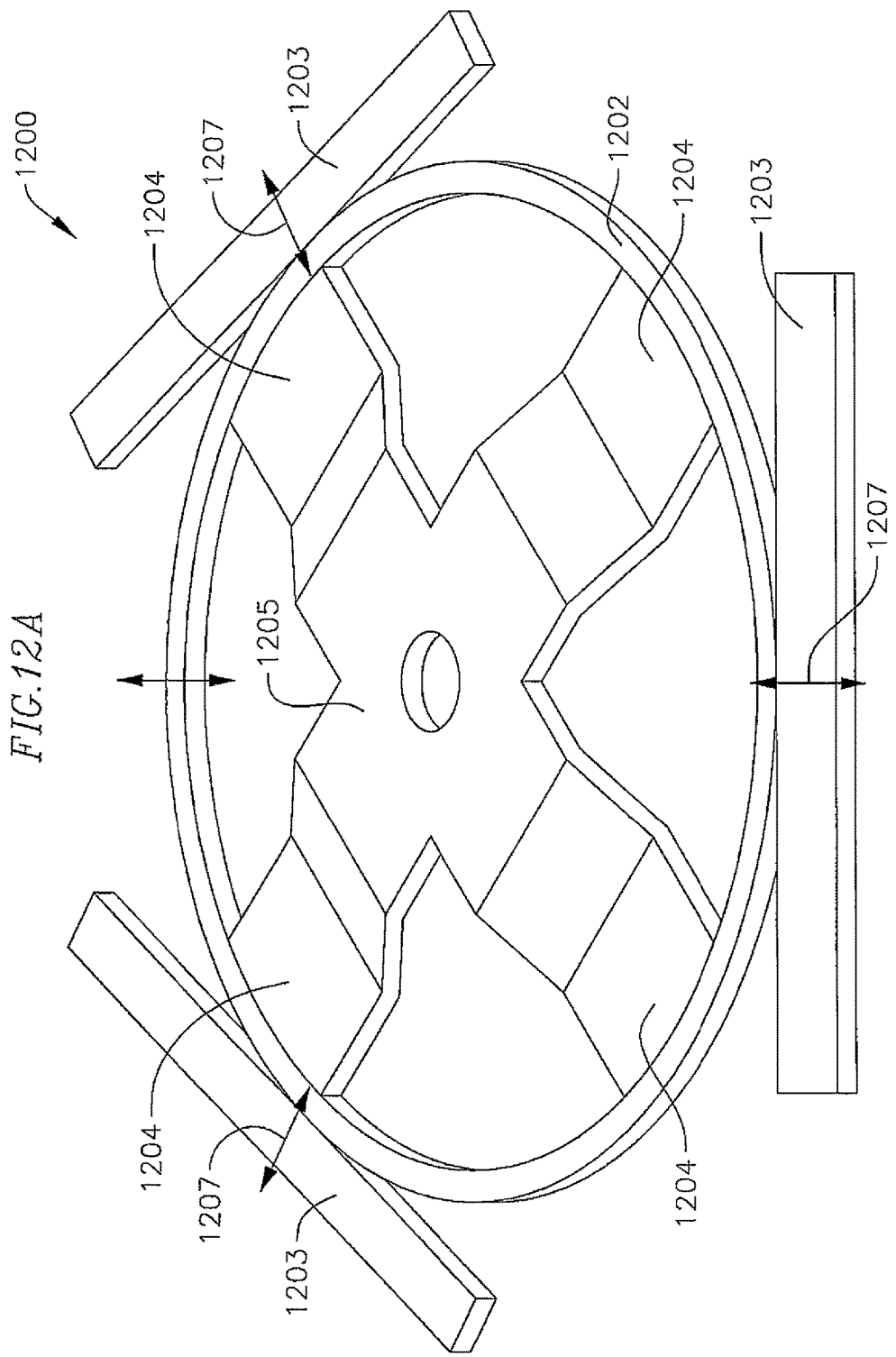

METHODS TO DYNAMICALLY ALTER THE STIFFNESS OF NONLINEAR STRUCTURES

CROSS-REFERENCE TO RELATED APPLICATION

This application claims the benefit of and priority to U.S. Provisional Application No. 61/800,827, filed Mar. 15, 2013, the entire content of which is incorporated herein by reference.

STATEMENT REGARDING FEDERALLY SPONSORED RESEARCH OR DEVELOPMENT

This invention was made with U.S. Government support under Contract No. HR0011-10-C-0125 awarded by the Defense Advanced Research Projects Agency (DARPA) Defense Sciences Office. The U.S. Government has certain rights to this invention.

FIELD

The present disclosure relates generally to the stiffness of non-linear structures and, more particularly, to varying the stiffness of non-linear structures.

BACKGROUND

Negative stiffness can be generated by non-linear behavior. For instance, simple and widely used non-linear structures that can generative negative stiffness include snap-through beams, buckling beams, over-rotation, and rolling or sliding contact between components. Non-linear structures that exhibit both positive and negative stiffness are potentially useful in a variety of mechanical design applications. For instance, as illustrated in FIG. 1, a negative stiffness element 10 (e.g., a buckling-type beam than can exhibit non-linear behavior) can be combined with a positive stiffness element 11, such as a spring, to provide a structure having zero or quasi-zero stiffness (QZS) over a range of displacements. The quasi-zero stiffness of the structure may be used to isolate another object 12 (e.g. a structure, device, package, and/or an instrument) from unwanted vibrations because the transmission of vibrations through systems of very low stiffness is minimal. However, these conventional isolating structures tend to be unstable in their isolating mode and are more easily utilized for their damping and shock isolation abilities, because manufacturing technologies and techniques are typically not accurate enough to create a QZS structure that does not require daily tuning. Additionally, conventional QZS structure may require very fine adjustment to achieve even moderate performance, which is both time-consuming and labor intensive. Additionally, very low (e.g., quasi-zero) stiffness can be theoretically obtained with very long linear springs, but such long springs are not practical in many applications due to size constraints.

SUMMARY

The present disclosure is directed to various embodiments of a variable stiffness structure and various methods of varying the stiffness of a structure. In one embodiment, the variable stiffness structure includes a negative stiffness element and an actuator operatively coupled to the negative stiffness element to control a stiffness of the negative stiffness element. In one embodiment, the variable stiffness structure includes a negative stiffness element and an actuator operatively coupled to the negative stiffness element. The actuator is configured to be actuated to control a stiffness of the negative stiffness element. The variable stiffness structure may also include a positive stiffness element coupled to the negative stiffness element. In one embodiment, the negative stiffness element, the positive stiffness element, and the actuator are configured to provide a range of stiffnesses of the structure in a range from substantially 0 to a stiffness of the combined negative stiffness element, the positive stiffness element, and the actuator. In one embodiment, the actuator coupled to the negative stiffness element is configured to set one or more stiffnesses of the structure in the range from substantially 0 to the stiffness of the combined negative stiffness element, the positive stiffness element, and the actuator. In one embodiment, the negative stiffness element is a beam configured for snap-through or buckling negative stiffness. In one embodiment, the beam may be either uniform or non-uniform such that end portions of the beam have a lower stiffness than a central portion of the beam. In one embodiment, the beam is in compression with an actuator at one or both ends of the beam. In one embodiment, the end portions of the beam include at least one of a flexure, a pivot, or a bearing.

Additionally, in one embodiment, the negative stiffness element includes a radial arrangement of beams between an inner shaft and an outer ring, and the negative stiffness element is configured for torsional snap-through negative stiffness. In one embodiment, the actuator changes a diameter of at least one of the inner shaft or the outer ring to control the negative stiffness of the negative stiffness element. In one embodiment, the actuator is either a linear motor or an active material, such as a piezoelectric material, an electro-active polymer, a magnetostrictive material, or a shape memory alloy. In one embodiment, the positive stiffness element may be a linear spring in parallel with the negative stiffness element or a linear spring in series with the negative stiffness element to control hysteretic damping.

In one embodiment, the variable stiffness structure includes a sensor coupled to the actuator. The sensor is configured to detect at least one condition of the negative stiffness element and control the amount of negative stiffness according to the at least one detected condition of the negative stiffness element. In one embodiment, the variable stiffness structure may include one or more additional sensors. In one embodiment, the sensor uses a closed-loop control to sense at least one of instantaneous stiffness of the structure or excitation frequency.

In one embodiment, the variable stiffness structure includes a series of actuators. In one embodiment, at least one of the actuators is configured to control at least one of the other actuators. In one embodiment, the variable stiffness structure includes a first actuator and a second actuator, wherein the first actuator is a different kind of actuator than the second actuator. In one embodiment, the first actuator has a different frequency response or a different displacement range than the second actuator.

The present disclosure is also directed to various embodiments of a device incorporating two or more variable stiffness structures each including a negative stiffness element and an actuator operatively coupled to the negative stiffness element to control a stiffness of the negative stiffness element. In one embodiment, the two or more variable stiffness structures are arranged in series and/or in parallel. In one embodiment, the variable stiffness structures are configured to provide a preload compensation, transfer energy, dissipate energy, harvest energy, and/or store energy.

The present disclosure is also directed to various methods of varying the stiffness of a non-linear structure exhibiting both positive stiffness and negative stiffness. In one embodiment, the method includes operating an actuator coupled to the non-linear structure to control the stiffness of the non-linear structure. The method may also include detecting at least one condition of the non-linear structure with a sensor and operating the actuator to control the stiffness of the non-linear structure according to the at least one detected condition of the non-linear structure.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIGS. 5A-5C are schematic representations of snap-through buckling beam type variable stiffness structures according to three embodiments of the present disclosure;

FIG. 5D is a schematic representation of a torsional variable stiffness structure according to one embodiment of the present disclosure;

FIGS. 12A-12C are schematic representations of variable stiffness structures according to further embodiments of the present disclosure;

DETAILED DESCRIPTION

Figure 1:
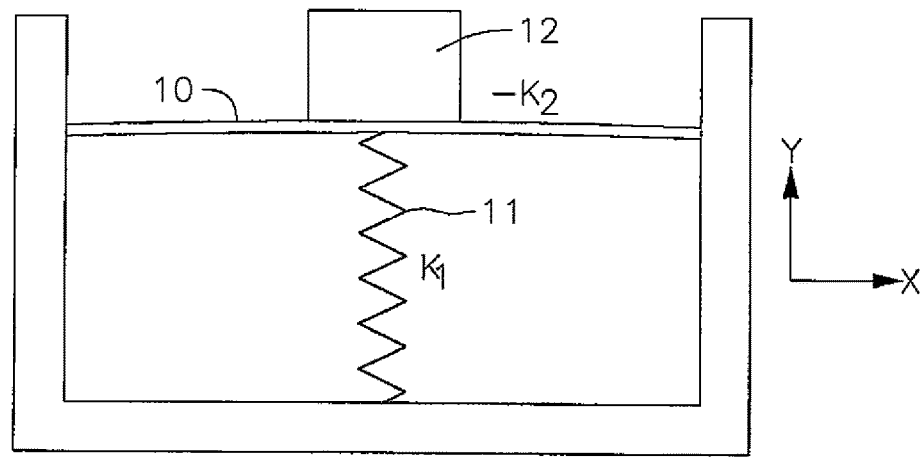
FIG. 1 is a side view of a conventional quasi-zero stiffness (QZS) structure having a positive stiffness element coupled to a negative stiffness element.

The present disclosure is directed to various embodiments of a variable stiffness structure and various methods of varying the stiffness of a structure. The variable stiffness structures of the present disclosure may be incorporated into any system or device in which it is desirable to prevent or at least reduce the transmission of vibration through the structure or device, such as, for instance, gyroscopes (wherein the accuracy of the gyroscope is proportional to the level of vibration isolation), passenger vehicles (e.g., vibration isolation between the engine and the chassis of the vehicle or between a wheel and the road), and aircraft (e.g., vibration isolation between a helicopter blade and a hub of the helicopter). The variable stiffness structure of the present disclosure may also be used as a mount with sufficiently low stiffness to prevent or reduce the transmission of vibrations through packages having a very small mass (e.g., weighing only milligrams). Transmissibility is a measure of vibration isolation quality and is defined as the ratio of the response amplitude of the isolated system or device to the excitation amplitude input into the system or device (i.e., the excitation amplitude is the force or displacement that the variable stiffness structures of the present disclosure are configured to prevent or at least reduce from being transmitted to a vibration-sensitive structure). The variable stiffness structures may also be tuned to increase transmission of vibrations, acting as an amplifier rather than an isolator. For example, the variable stiffness structures of the present disclosure may be incorporated into an energy harvester system to capture and store at least a portion of the energy associated with a vibration source.

The variable stiffness structures of the present disclosure are also configured to switch between a range of different stiffnesses, such as, for instance, low stiffness, quasi-zero stiffness, zero stiffness, and high stiffness, depending upon the particular application of the variable stiffness structure and the excitation frequency acting on the system or the isolated mass. For instance, in an embodiment in which the variable stiffness structure is incorporated into a passenger vehicle, the stiffness of the variable stiffness structure may be increased when the vehicle is traveling around a corner to provide increased roll stability and the stiffness of the variable stiffness structure may be reduced when the vehicle is traveling straight over rough or uneven terrain to isolate the vibrations from the ground and thereby improve driver and passenger comfort. Additionally, optimal isolation typically occurs at an anti-resonance frequency above the natural frequency (i.e., twice the natural frequency), and therefore the stiffness of the variable stiffness structures of the present disclosure may be dynamically adjusted to substantially match the anti-resonance frequency of the variable stiffness structure to the input excitation frequency. The stiffness of the variable stiffness structure may also be dynamically varied to suitably respond to external vibration conditions, such as, for instance, low-frequency vibrations in which a high stiffness structure may be desired, high-frequency unwanted vibrations in which a low stiffness structure may be desired, and/or single-frequency vibrations for energy conversion or energy harvesting in which a specific adaptive stiffness may be desired. For instance, the stiffness of the variable stiffness structure may be dynamically varied as a helicopter rotor changes velocity or as a car engine accelerates and thereby increases the number of revolutions of the drive shaft.

Figure 2:
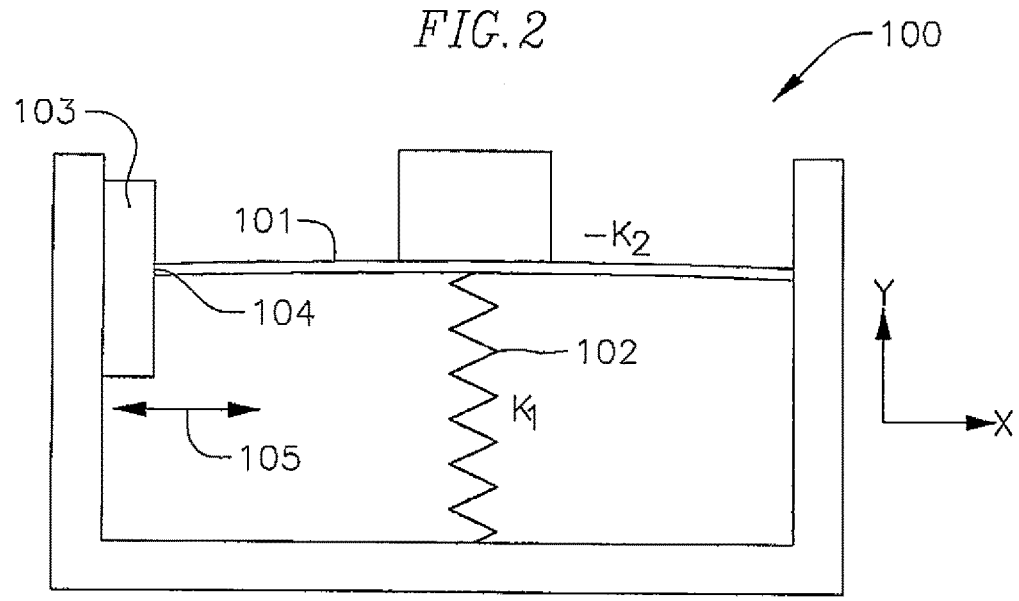
FIG. 2 is a schematic representation of a variable stiffness structure having a positive stiffness element, a negative stiffness element, and an actuator operatively coupled to the negative stiffness element to control the negative stiffness of the structure according to one embodiment of the present disclosure.

With reference now to FIG. 2, a variable stiffness structure 100 according to one embodiment of the present disclosure includes a negative stiffness element 101, a positive stiffness element 102 coupled to the negative stiffness element 101, and an actuator 103 operatively coupled to one end 104 of the negative stiffness element 101. The actuator 103 is configured to be actuated (arrow 105) between a plurality of different positions to control the stiffness of the negative stiffness element 101. In particular, as the actuator 103 expands along the x-direction and applies a compressive force to the negative stiffness element 101, the negative stiffness of the negative stiffness element 101 increases. As the actuator 103 contracts along the x-direction and reduces the compressive force on the negative stiffness element 101, the negative stiffness of the negative stiffness element 101 decreases. Providing the actuator 103 at one end 104 of the negative stiffness element 101 is configured to provide a high gain between the actuator 103 displacement and the magnitude of the amount of negative stiffness of the negative stiffness element 101. Although in the embodiment illustrated in FIG. 2 the variable stiffness structure 100 includes a single actuator 103 located at one end 104 of the negative stiffness element 101, in one or more alternate embodiments, the variable stiffness structure 100 may include any other suitable number of actuators located at any other suitable positions relative to the negative stiffness element 101, such as, for instance, a pair of actuators located at opposite ends of the negative stiffness element 101. Additionally, in one embodiment, the variable stiffness structure 100 may include a first actuator that is a different kind of actuator from a second actuator (e.g., the first actuator may have a different frequency response or displacement range than the second actuator). In one embodiment in which the variable stiffness structure 100 includes a plurality of actuators, at least one of the actuators may be configured to control at least one of the other actuators.

In the embodiment illustrated in FIG. 2, the negative stiffness element 101 is a snap-through beam (e.g., a buckling-type beam), although in one or more alternate embodiments the negative stiffness element 101 may any other suitable kind of structure exhibiting negative stiffness. In embodiments in which the negative stiffness element 101 is a snap-through beam, the actuator 103 may be connected in parallel with the snap-through negative stiffness element 101. In some embodiments, an angle may be defined between the negative stiffness element 101 and the orientation of the actuator 103, such as, for instance, from approximately or about 3 degrees to approximately 30 degrees. This angle between the actuator 103 and the snap-through negative stiffness element 101 is the ratio between half the actuator 103 throw and an arm length of the negative stiffness element 101. The angle between the actuator 103 and the snap-through beam 101 (i.e., the negative stiffness element) is also half the angle that the snap-through beam 101 snaps through. In one or more alternate embodiments, if very flexible materials and joints are used (e.g., ball bearings and/or plastic), angles of up to 300 between the actuator 103 and the negative stiffness element 101 may be feasible.

In the embodiment illustrated in FIG. 2, the positive stiffness element 102 is a spring, although in one or more alternate embodiments, the positive stiffness element 102 may be any other suitable kind of structure exhibiting positive stiffness. Additionally, in one or more embodiments, the positive stiffness element 102 may be a component already present in the structure, system, or assembly into which the variable stiffness structure 100 is incorporated. For instance, in an embodiment in which the variable stiffness structure 100 is incorporated into a vehicle, a mounting bracket or a sub-frame assembly of the vehicle may function as the positive stiffness element 102. Accordingly, the positive stiffness element 102 may not be a separate component, but instead may be a pre-existing component of the structure, system, or assembly into which the variable stiffness structure 100 is incorporated.

Additionally, although in the embodiment illustrated in FIG. 2 the positive stiffness element 102 is in direct contact with the negative stiffness element 101, in one or more alternate embodiments, the positive stiffness element 102 may be physically separated from the negative stiffness element 101 and coupled to the negative stiffness element 101 by any suitable structure, such as, for instance, by linkages. Further, in the illustrated embodiment, the positive stiffness element 102 and the negative stiffness element 101 are mechanically in parallel. In one or more alternate embodiments, the positive stiffness element 102 and the negative stiffness element 101 may act in different directions and may be coupled via linkages to provide a single-direction resultant force.

Suitable materials for the negative stiffness element 101, the positive stiffness element 102, and the actuator 103 depend on a variety of factors, including, the particular application of the variable stiffness structure 100, the desired size of the variable stiffness structure 100, and the desired mechanical properties of the variable stiffness structure 100 (e.g., a high strength to elastic modulus ratio, high elastic strain, low creep, low damping, and/or long fatigue life). In one or more embodiments, suitable materials for the negative stiffness element 101, the positive stiffness element 102, and the actuator 103 include metal alloys (e.g. Fe and/or Al), metallic glasses, composite materials (e.g., fiberglass and/or carbon fiber-based polymer composites), engineering plastics, and combinations thereof. For instance, in an embodiment in which the variable stiffness structure 100 is configured to isolate a vehicle's suspension, the negative stiffness element 101 and the positive stiffness element 102 may be made out of steel. In an embodiment in which the variable stiffness structure 100 is configured to isolate a computer chip from unwanted vibrations, the negative stiffness element 101 and the positive stiffness element 102 may be made out of a piezoelectric material or silicon. The negative stiffness element 101 and/or the positive stiffness element 102 may also be made out of an active material, such as, for instance, thermal expansion materials, shape memory alloys, piezoelectric materials, or electro-active polymers. Additionally, in embodiments in which the negative stiffness element 101 and/or the positive stiffness element 102 are made out of an active material, the negative stiffness element 101 and/or the positive stiffness element 102 may function as the actuator such that the actuator is not a separate component. For instance, if the negative stiffness element 101 is made out of a material with high thermal expansivity, an electric current may be passed through the negative stiffness element 101 that can resistively heat the negative stiffness element 101 and cause it to selectively expand and contract, thereby decreasing and increasing, respectively, the negative stiffness of the negative stiffness element 101 in the same or similar manner as a separate actuator 103. In one or more alternate embodiments, the negative stiffness element 101 and/or the positive stiffness element 102 may comprise electrostatic forces rather than a structure component made out of a particular material. Additionally, in or more embodiments, the positive stiffness element 102 may have structural and environmental properties similar to the negative stiffness element 101 (e.g., being made of a same structural material via similar manufacturing processes, such as laser-cut spring steel), which can provide advantages in manufacturing cost and device complexity, although in one or more alternate embodiments, the negative stiffness element 101 and the positive stiffness element 102 may be made out of dissimilar materials.

Figure 3:
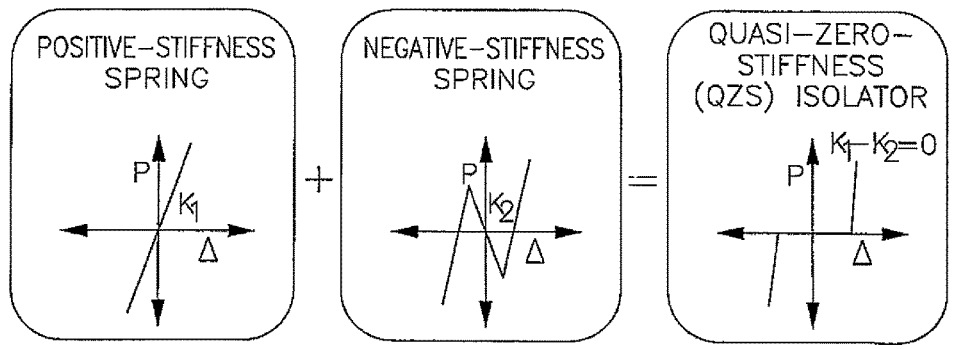
FIG. 3 is a graph illustrating the linear stiffness $k_1$ of a positive stiffness element alone, the non-linear stiffness of a negative stiffness element having negative stiffness $-k_2$ over a central portion of the stiffness profile, and the quasi-zero stiffness of the combined positive and negative stiffness elements when the negative stiffness $-k_2$ is substantially equal to the positive stiffness $k_1$.

As illustrated in FIG. 3, the positive stiffness element 102 individually is configured to provide a constant positive stiffness ($k_1$) over a range of displacements (A) such that the restorative force (P) of the positive stiffness element 102 varies linearly with the displacement (A) of the positive stiffness element 102 (i.e., the positive stiffness element 102 obeys Hooke's law). The negative stiffness element 101 individually is configured to provide non-linear stiffness. As illustrated in FIG. 2, the negative stiffness element 101 exhibits either negative stiffness or positive stiffness depending upon the amount of displacement (A) of the negative stiffness element 101. In particular, the negative stiffness element 101 has a non-linear stiffness profile exhibiting positive stiffness over a first portion of the profile, negative stiffness over a central portion of the profile, and positive stiffness again following the portion of negative stiffness.

Together, the negative stiffness element 101 and the positive stiffness element 102 provide an effective quasi-zero stiffness (QZS) of the structure 100 when the absolute value of the negative stiffness ($-k_2$) of the negative stiffness element 101 is substantially equal to the stiffness ($k_1$) of the positive stiffness element 102 (i.e., the overall stiffness of the structure 100 is calculated by summing the positive stiffness ($k_1$) of the positive stiffness element 102 and the negative stiffness ($-k_2$) of the negative stiffness element 101). The effective quasi-zero stiffness of the structure 100 exists over the range of displacements (A) corresponding to the negative stiffness portion of the stiffness profile of the negative stiffness element 101. Thus, the variable stiffness structure 100 illustrated in FIG. 2 is configured to provide quasi-zero stiffness isolation (i.e., coupling the positive stiffness element 102 in parallel with the negative stiffness element 101 can create a locally soft system that can isolate vibrations within the quasi-zero stiffness range).

Additionally, as illustrated in FIG. 3, by matching or substantially matching the magnitude of the negative stiffness ($-k_2$) of the negative stiffness element 101 to the positive stiffness ($k_1$) of the positive stiffness element 102, the positive stiffness element 102 and the negative stiffness element 101 cooperate such that the variable stiffness structure 100 is configured to provide a range of stiffnesses from substantially zero to the stiffness of the positive stiffness element 102. Accordingly, the actuator 103 may be actuated to compress the negative stiffness element 101 and thereby change the negative stiffness of the negative stiffness element 101 to set the overall stiffness of the variable stiffness structure 100 to a particular stiffness within the range from substantially zero to the stiffness of the positive stiffness element 102. In general, high stiffness can be used in a transmission of low-frequency control inputs with reduced or minimal lag, whereas low stiffness can be used for the isolation of unwanted vibrations (e.g., a lightly damped structure isolates frequencies more than 2× the natural frequency, so low stiffness can provide inherently broadband or wide-ranging isolation).

Figure 4A:
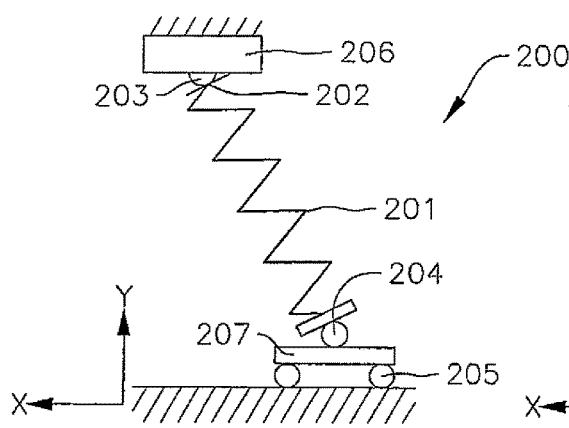
FIGS. 4A-4C are schematic representations of variable stiffness structures generating negative stiffness through over-rotation according to three embodiments of the present disclosure.
Figure 4B:
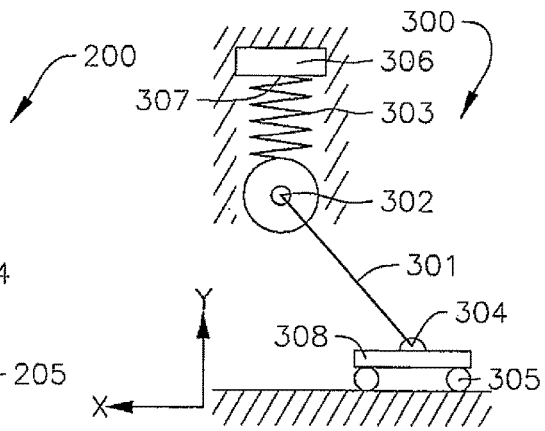
Figure 4C:
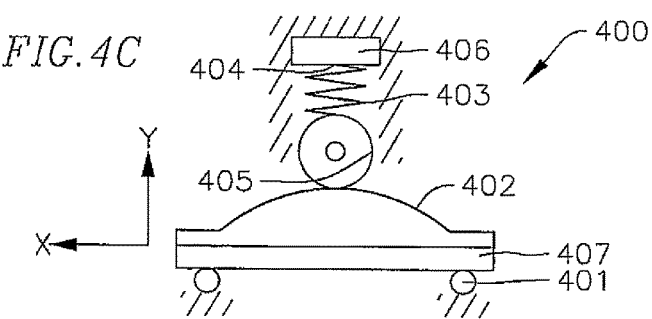

With reference now to FIGS. 4A-4C, variable stiffness structures according to further embodiments of the present disclosure are disclosed. As described in detail below, the negative stiffness of each of the variable stiffness structures illustrated in FIGS. 4A-4C is generated through over-rotation. In the embodiment illustrated in FIG. 4A, a variable stiffness structure 200 includes a spring 201 having a first end 202 rotatably coupled to a pin 203 and a second end 204 coupled to a roller 205 slidable along an x-direction. When a force is applied to the roller 205 in the x-direction such that the roller 205 moves along the x-direction, the spring 201 compresses and provides a positive stiffness. However, as the roller 205 continues to move along the x-direction toward a point underneath the pin 203, the spring 201 will reach a snap-through point at which the spring 201 will "snap through" to a stable point on the other side of the pin 203. In the illustrated embodiment, the snap through point corresponds to the point at which the second end 204 of the spring 201 is directly underneath the pin 203. During snap through, the variable stiffness structure 200 exhibits negative stiffness (i.e., the variable stiffness structure 200 generates negative stiffness during snap-through between two stable positions). Accordingly, the variable stiffness structure 200 exhibits non-linear stiffness (i.e., the variable stiffness structure 200 exhibits both positive and negative stiffness as the roller 205 moves along the x-direction).

With continued reference to the embodiment illustrated in FIG. 4A, the variable stiffness structure 200 also includes first and second actuators 206, 207 coupled to the first and second ends 202, 204 of the spring 201, respectively. In one or more alternate embodiments, the variable stiffness structure 200 may include any other suitable number of actuators at any other suitable locations, such as, for instance, a single actuator coupled to either the first end 202 or the second end 204 of the spring 201. The actuators 206, 207 may each be actuated to compress or elongate the spring 201 and thereby increase or decrease, respectively, the amount of negative stiffness of the variable stiffness structure 200 (i.e., the actuators 206, 207 are configured to expand and compress along the y-direction to control the degree of negative stiffness of the variable stiffness structure 200).

With reference now to the embodiment illustrated in FIG. 4B, a variable stiffness structure 300 includes a swing arm 301 having a first end 302 rotatably coupled to a linear spring 303 and a second end 304 coupled to a roller 305 slidable along an x-direction. As the roller 305 moves along the x-direction, the swing arm 301 compresses the spring 303 such that the variable stiffness structure 300 provides a positive stiffness. As the roller 305 continues to move along the x-direction toward a point underneath the linear spring 303, the swing arm 301 will reach a snap-through point at which the swing arm 301 will snap through to a point on the other side of the linear spring 303. In one embodiment, the snap through point corresponds to the point at which the second end 304 of the swing arm 301 is directly aligned underneath the spring 303. During snap through, the variable stiffness structure 300 exhibits negative stiffness. Accordingly, the variable stiffness structure 300 exhibits non-linear stiffness. In the illustrated embodiment, the variable stiffness structure 300 also includes a first actuator 306 coupled to an upper end 307 of the linear spring 303 and a second actuator 308 coupled to the second end 304 of the swing arm 301. In one or more alternate embodiments, the variable stiffness structure 300 may include any other suitable number of actuators at any other suitable locations, such as, for instance, a single actuator coupled to either the upper end 307 of the spring 303 or the second end 304 of the swing arm 301. The actuators 306, 308 may each be actuated to compress or elongate the spring 303 and thereby increase or decrease, respectively, the amount of negative stiffness of the variable stiffness structure 300 (i.e., the actuators 306, 308 are configured to expand and compress along the y-direction to control the degree of negative stiffness of the variable stiffness structure 300).

With reference now to FIG. 4C, a variable stiffness structure 400 according to another embodiment of the present disclosure includes a roller 401 slidable along an x-direction. The roller 401 includes an arcuate profile 402 (e.g., a semi-circular profile) having a thicker inner portion and thinner outer portions. The variable stiffness structure 400 also includes a linear spring 403 having a first end 404 fixed to a structure and a second end 405 slidable along the arcuate profile 402 of the roller 401. As the roller 401 moves along the x-direction, the arcuate profile 402 of the roller 401 compresses the spring 403 such that the variable stiffness structure 400 provides a positive stiffness (e.g., the linear spring 403 will compress as the second end 405 of the linear spring 403 slides along the arcuate profile 402 of the roller 401 and moves from engaging a thinner outer portion of the arcuate profile 402 toward the thicker inner portion of the arcuate profile 402). As the roller 401 continues to move along the x-direction toward a point underneath the linear spring 403, the roller 401 will reach a snap-through point at which the roller 401 will snap through to a point on the other side of the linear spring 403. In one embodiment, the snap through point corresponds to the point at which the thicker inner portion of the arcuate profile 402 is directly aligned underneath the linear spring 403. During snap through, the variable stiffness structure 400 exhibits negative stiffness. Accordingly, the variable stiffness structure 400 exhibits non-linear stiffness.

In the embodiment illustrated in FIG. 4C, the variable stiffness structure 400 also includes a first actuator 406 coupled to the first end 404 of the linear spring 403 and a second actuator 407 coupled to the roller 401. In one or more alternate embodiments, the variable stiffness structure 400 may include any other suitable number of actuators at any other suitable locations, such as, for instance, a single actuator coupled to either the first end 404 of the spring 403 or the roller 401. The actuators 406, 407 may each be actuated to compress or elongate the spring 403 and thereby increase or decrease, respectively, the amount of negative stiffness of the variable stiffness structure 400 (i.e., the actuators 406, 407 are configured to expand and compress along the y-direction to control the degree of negative stiffness of the variable stiffness structure 400).

With reference now to FIGS. 5A-5C, variable stiffness structures according to additional embodiments of the present disclosure are illustrated. Each of the variable stiffness structures illustrated in FIGS. 5A-5C include a buckling-type (or buckling-kind) negative stiffness member. In the embodiment illustrated in FIG. 5A, a variable stiffness structure 500 includes a buckling-type snap through beam 501 coupled at opposite ends 502, 503 to structures or supports 504, 505, respectively. In the embodiment illustrated in FIG. 5A, the beam 501 is a "composite" beam wherein the thickness of the beam varies along the length of the beam (i.e., the beam has non-uniform thickness). In particular, in the illustrated embodiment, the ends 502, 503 and a center portion 506 of the snap-through beam 501 have a lower thickness and stiffness than remaining portions of the snap-through beam 501. In one or more alternate embodiments, the snap-through beam 501 may be monolithic (i.e., the thickness of the beam 501 is constant or substantially constant along the length of the beam 501). Additionally, in one or more alternate embodiments, one or both of the ends 502, 503 may be coupled to a low stiffness coupler, such as, for instance, a flexure, a pivot, a bearing, a roller bearing pin, or a wobble-pin.

FIG. 5A also illustrates an object or structure 507 that the variable stiffness structure 500 is configured to isolate from unwanted vibrations. In the illustrated embodiment, the object 507 is coupled to the center portion 506 of the beam 501. The snap-through beam 501 is configured to "snap" between a first stable position (shown in solid lines) and a second stable position (shown in dashed lines). Within an envelope defined or bounded by these two stable positions, the variable stiffness structure 500 exhibits negative stiffness (i.e., negative stiffness is generated during snap through between the two stable positions illustrated in FIG. 5A). Outside of this envelope bounded by the two stable positions of the snap-through beam 501, the variable stiffness structure 500 exhibits positive stiffness. Accordingly, the variable stiffness structure 500 exhibits non-linear stiffness. In one or more embodiments, the stiffness of the beam 501 may be relatively high and the variable stiffness structure 500 may include a spring or a managed-stiffness housing coupled to one end 502 or 503 of the beam 501 to facilitate snap-through of the beam 501. Additionally, in one embodiment, the snap-through beam 501 may have an aspect ratio of length to thickness between approximately or about 5:1 and approximately or about 20:1 and an aspect ratio of width to thickness between approximately or about 1:2 and approximately or about 1:10, which can allow for suitable buckling resistance.

In the embodiment illustrated in FIG. 5A, the variable stiffness structure 500 also includes an actuator 508 operatively coupled to one end 502 of the snap-through beam 501. In one or more alternate embodiments, the variable stiffness structure 500 may include any other suitable number of actuators located at any other suitable positions relative to the negative stiffness beam 501, such as, for instance, a single actuator located at the other end 503 of the snap-through beam 501 or a pair of actuators located at opposite ends 502, 503 of the snap-through beam 501 (i.e., the negative stiffness beam). The actuator 508 may be actuated (arrow 509) to compress or elongate the snap-through beam 501 and thereby increase or decrease, respectively, the amount of negative stiffness of the variable stiffness structure 500 (i.e., the actuator 508 is configured to expand and compress (arrow 509) along the x-direction to decrease and increase, respectively, the distance between the opposite ends 502, 503 of the negative stiffness beam 501 and thereby control the degree of negative stiffness of the variable stiffness structure 500). In an embodiment in which one of the end 503 of the snap-through beam 501 is coupled to a spring to facilitate snap-through, the variable stiffness structure 500 may function similar to the variable stiffness structure 300 described above with reference to FIG. 4B.

The buckling-type snap through beam 501 of FIG. 5A is a "mode 1" or single-mode type beam. The mode number refers to the number of times the buckling-type snap through beam 501 (i.e., the negative stiffness element) crosses its centerline during buckling (i.e., the number of "humps" or sine waves that are present during buckling). In one or more alternate embodiments, higher mode negative stiffness elements may be used, such as, for instance, the mode-3 beam described below with reference to FIG. 5C. In general, modes 2 and higher allow for higher throw (A) in the same size package, at the expense of reduced maximum negative stiffness.

With reference now to the embodiment illustrated in FIG. 5B, a variable stiffness structure 600 includes a snap-through beam negative stiffness element 601 coupled at opposite ends 602, 603 to structures or supports 604, 605, respectively. In the illustrated embodiment, the snap-through beam 601 is monolithic (i.e., the thickness of the beam 601 is constant or substantially constant along the length of the beam 601). Additionally, in the illustrated embodiment, the snap-through beam 601 is a "mode 1" or single-mode type beam. Like the snap-through beam 501 described above with reference to FIG. 5A, the snap-through beam 601 is configured to "snap" between a first stable position (shown in solid lines) and a second stable position (shown in dashed lines) during which the variable stiffness structure 600 exhibits negative stiffness. Outside of this envelope bounded by the two stable positions of the snap-through beam 601, the variable stiffness structure 600 exhibits positive stiffness. Accordingly, the variable stiffness structure 600 exhibits non-linear stiffness. The variable stiffness structure 600 also includes an actuator 606 operatively coupled to one end 602 of the snap-through beam 601 and configured to be actuated (arrow 607) to compress or elongate the snap-through beam 601 and thereby increase or decrease, respectively, the amount of negative stiffness of the variable stiffness structure 600. In the illustrated embodiment, the variable stiffness structure 600 is configured to isolate an object or structure 608 coupled to a center portion of the snap-through beam 601 from unwanted vibrations. Additionally, in one or more embodiments, the variable stiffness structure 600 may function similar to the variable stiffness structure 200 described above with reference to FIG. 4A because the snap-through beam 601 is configured to store energy similar to a spring.

With reference now to FIG. 5C, a variable stiffness structure 700 according to another embodiment of the present disclosure includes a snap-through beam negative stiffness element 701 coupled at opposite ends 702, 703 to structures or supports 704, 705, respectively. In the illustrated embodiment, the snap-through beam 701 is monolithic, although in one or more alternate embodiments the thickness of the snap-through beam 701 may vary across the length of the snap-through beam 701 to induce buckling mode shapes that are not "pure" cosine curves. Additionally, in the illustrated embodiment, the snap-through beam 701 is a "mode 3" type (or kind) beam (i.e., the snap-through beam 701 has three "humps" during buckling). The snap-through beam 701 is configured to "snap" between a first stable position (shown in solid lines) and a second stable position (shown in dashed lines) during which the variable stiffness structure 700 exhibits negative stiffness. Outside of this envelope bounded by the two stable positions of the snap-through beam 701, the variable stiffness structure 700 exhibits positive stiffness. Accordingly, the variable stiffness structure 700 exhibits non-linear stiffness. The variable stiffness structure 700 also includes an actuator 706 operatively coupled to one end 702 of the snap-through beam 701 and configured to be actuated (arrow 707) to compress or elongate the snap-through beam 701 and thereby increase or decrease, respectively, the amount of negative stiffness of the variable stiffness structure 700. In the illustrated embodiment, the variable stiffness structure 700 is configured to isolate an object or structure 708 coupled to a center portion of the snap-through beam 701 from unwanted vibrations.

During snap-through, composite beam negative stiffness elements (e.g., beam 501 in FIG. 5A) may store energy in an actuator (e.g., actuator 508 in FIG. 5A) coupled to the composite beam. In one or more alternate embodiments, composite beam negative stiffness elements may store energy in a horizontal spring at one end of the composite beam during snap-through. In contrast, monolithic beam negative stiffness elements (e.g., beam 601 in FIG. 5B and beam 701 in FIG. 5C), when coupled to an actuator (e.g., actuator 606 in FIG. 5B or actuator 706 in FIG. 5C), may store energy in the monolithic beams themselves during snap-through. Therefore, a selection between a monolithic beam and a composite beam may depend on where it is desired to store energy during snap through (e.g., whether it is desired to store energy during snap through in the negative stiffness element or another component of the variable stiffness structure). Additionally, in order to provide structural stability in directions other than the isolating direction, and in order to inhibit higher-mode buckling of the snap-through beams, it may be infeasible to store all the energy in the beams themselves. Accordingly, in one or more embodiments, an additional spring/actuator can be designed to provide a desired stiffness in all directions.

With reference now to FIG. 5D, a variable stiffness structure 800 according to another embodiment of the present disclosure includes an outer ring 801, an axle or inner/central shaft 802 concentric with the outer ring 801, a plurality of negative stiffness elements 803 circumferentially disposed around the axle 802 and extending radially between the axle 802 and the outer ring 801, and an actuator 804 operatively coupled to outer ends 805 of the negative stiffness elements 803 and the outer ring 801. In one embodiment, the outer ring 801 is a spring-loaded roller. In the illustrated embodiment, the actuator 804 is cylindrically shaped and substantially matches the shape of the outer ring 801. The actuator 804 is configured to be actuated (arrow 806) to compress or elongate the negative stiffness elements 803 and thereby increase or decrease, respectively, the amount of negative stiffness of the variable stiffness structure 800 (i.e., the actuator 804 is configured to radially expand and contract to increase and decrease, respectively, the distance between the outer ring 801 and the axle 802 and thereby control the degree of negative stiffness of the variable stiffness structure 800). Each of the negative stiffness elements 803 is configured to "snap" between a first stable position (shown in solid lines) and a second stable position (shown in dashed lines) during which the variable stiffness structure 800 exhibits torsional negative stiffness. The variable stiffness structure 800 is configured to isolate an object or structure from torsional vibrations. For instance, the variable torsional stiffness structure 800 may be incorporated into a passenger vehicle to isolate vibrations from a drive shaft of the vehicle. Other suitable configurations of the outer ring 801, the axle 802, and the negative stiffness elements 803 are described in U.S. patent application Ser. No. 13/802,197, entitled "Assembly with Negative Torsional Stiffness," the entire content of which is incorporated herein by reference. As with the linear variable stiffness structures 100-700 described previously, the variable torsional stiffness structure 800 is stabilized in its neutral position (i.e., between the two stable positions of the negative stiffness elements 803, shown in solid and dashed lines) by at least one matching positive stiffness torsion element.

Figure 6:
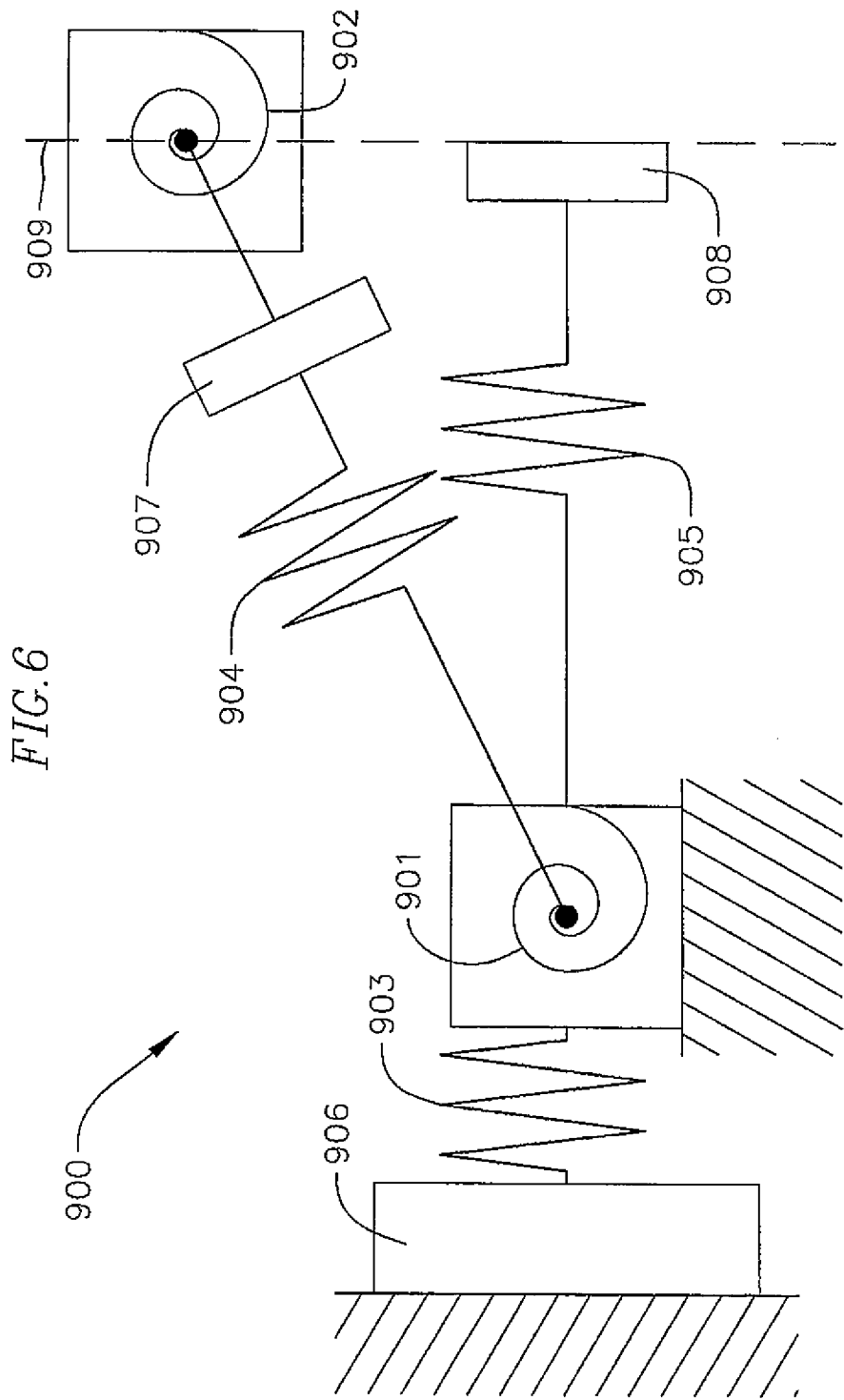
FIG. 6 is a schematic representation of a variable stiffness structure according to one embodiment of the present disclosure.

With reference now to FIG. 6, a variable stiffness structure 900 according to another embodiment of the present disclosure includes a network of torsional springs 901, 902, compression springs 903, 904, 905, and actuators 906, 907, 908. In one embodiment, the springs 901, 902, 903, 904, and 905 are conservative (i.e., they do not dissipate energy and are path-independent), nonlinear springs. In the illustrated embodiment, linear spring 903 is disposed between actuator 906 and torsional spring 901, linear spring 905 is disposed between torsional spring 901 and actuator 908, and linear spring 904 is disposed between torsional spring 901 and torsional spring 902. Actuator 907 is coupled to linear spring 904. The actuators 906, 907, 908 are configured to control the compressive force on the linear springs 903, 904, 905, respectively, and thereby adjust the stiffness of the structure 900. Examples of suitable springs include, but are not limited to, a coil spring, a strip of steel, a pair of charged plates (electrostatic), a pair of permanent magnets, and a post-buckled beam. The specific spring technology utilized may depend on the particular application and/or availability of manufacturing techniques at a particular length scale. In one embodiment, in a larger network of positive and negative stiffness springs, the entire system can be configured to have QZS, while individual elements have some finite positive or negative stiffness, which can be tuned to provide multiple degrees of freedom and multiple position (changing snap-through point) isolation.

The variable stiffness structure 900 illustrated in FIG. 6 may be configured to function the same as or similar to one of the variable stiffness structures 100-800 described above. For instance, the variable stiffness structure 900 can be mirrored about plane of symmetry 909 such that the variable stiffness structure 900 functions similar to the variable stiffness structure 100 illustrated in FIG. 2. Additionally, the variable stiffness structure 900 can be radially repeated about an axis extending out of the page such that the variable stiffness structure 900 functions similar to the variable stiffness structure 800 illustrated in FIG. 5D. The variable stiffness structure 900 may also be radially repeated about the axis extending out of the page such that the variable stiffness structure 900 functions similar to variable stiffness structure 1200 described below with reference to FIGS. 12A-12C.

Additionally, the variable stiffness structure 900 may be modified to function like the variable stiffness structures 500, 600, 700 illustrated in FIGS. 5A, 5B, and 5C, respectively. For instance, the variable stiffness structure 900 can be configured to function like the variable stiffness structure 600 illustrated in FIG. 5B by excluding linear spring 905 and actuator 908, providing linear spring 903 with infinite stiffness, providing torsional springs 901 and 902 with stiffness equal to the bending stiffness of the negative stiffness element (i.e., the monolithic, mode-1 beam 601 of FIG. 5B), and providing linear spring 904 with stiffness equal to the axial stiffness of the negative stiffness snap-through beam 601. The stiffness of springs 901, 904, and 902 can be derived by treating the monolithic, mode-1 buckling beam 601 as a pseudo-rigid-body. Additionally, the variable stiffness structure 900 can be configured to function like the variable stiffness structure 500 illustrated in FIG. 5A, assuming the thick section of the composite mode-1 beam 501 is relatively thicker than the ends of the beam, by providing linear spring 904 with infinite stiffness, providing torsional springs 901 and 902 with stiffnesses equal to the bending stiffness of the negative stiffness element (i.e., the composite, mode-1 beam 501 of FIG. 5A). Linear springs 903 and/or 905 are configured to store energy during snap-through and their values control the amount of negative stiffness of the structure 900 as actuators 906, 908 change their position and thereby compress or elongate linear springs 903, 905. Furthermore, the variable stiffness structure 900 may be modified to function like the variable stiffness structure 200 illustrated in FIG. 2A by excluding torsional springs 901, 902 and linear spring 905 (i.e., providing springs 901, 902, and 905 with zero stiffness), and providing spring 903 with infinite stiffness (i.e., making linear spring 902 rigid). Additionally, the variable stiffness structure 900 may be modified to function like the variable stiffness structure 800 in FIG. 5D by radially repeating six of the variable stiffness structure 900 about an axis extending out of the page, eliminating linear spring 905 (i.e., providing linear spring 905 with zero stiffness), providing linear spring 903 with infinite stiffness (i.e., making linear spring 903 rigid), providing springs 902, 904, and 901 with stiffnesses equal to the bending stiffness of the negative stiffness elements (i.e., snap-through beam elements 803 in FIG. 5D), and eliminating actuator 908. The variable stiffness structure 900 may include actuator 906 and/or actuator 907 to adjust the stiffness of the structure 900. Providing the structure 900 with actuator 907 is functionally equivalent to providing the structure with actuator 906, but providing the structure 900 with only actuator 907 may have packaging advantages over providing the structure 900 with actuator 906. The common element in each of these embodiments is the addition of an actuator to alter the amount of negative stiffness to create a highly variable stiffness structure.

The variable stiffness structures 100-900 of the present disclosure may include any suitable kinds of actuators, such as, for instance, active materials (e.g., piezoelectric materials, shape memory alloys, magnetostrictive materials, electro-active polymers, and dielectric elastomers), servo motors, stepper motors, solenoids, ultrasonic drives, voice coils, hydraulics, wedges, levers, or tapered shafts.

In an embodiment, the selection of a suitable actuator may be based on a desired level of precision and/or speed for controlling the amount of negative stiffness of the variable stiffness structure. In some embodiments, a combination of actuators may be used in order to obtain a desired level of precision and/or speed for controlling the amount of negative stiffness, particularly when a single kind of actuator is not suitable to provide the desired level of both precision and speed. For example, a piezoelectric material can provide a relatively very fine adjustment, but over a relatively limited range. As a further example, a linear motor can provide adjustment over a relatively large range, but provides a relatively course adjustment. Various other actuators identifiable by a skilled person can be used, alone or combination with other actuators (of a same or a different kind), in order to control an amount of negative stiffness in a structure.

Figure 7:
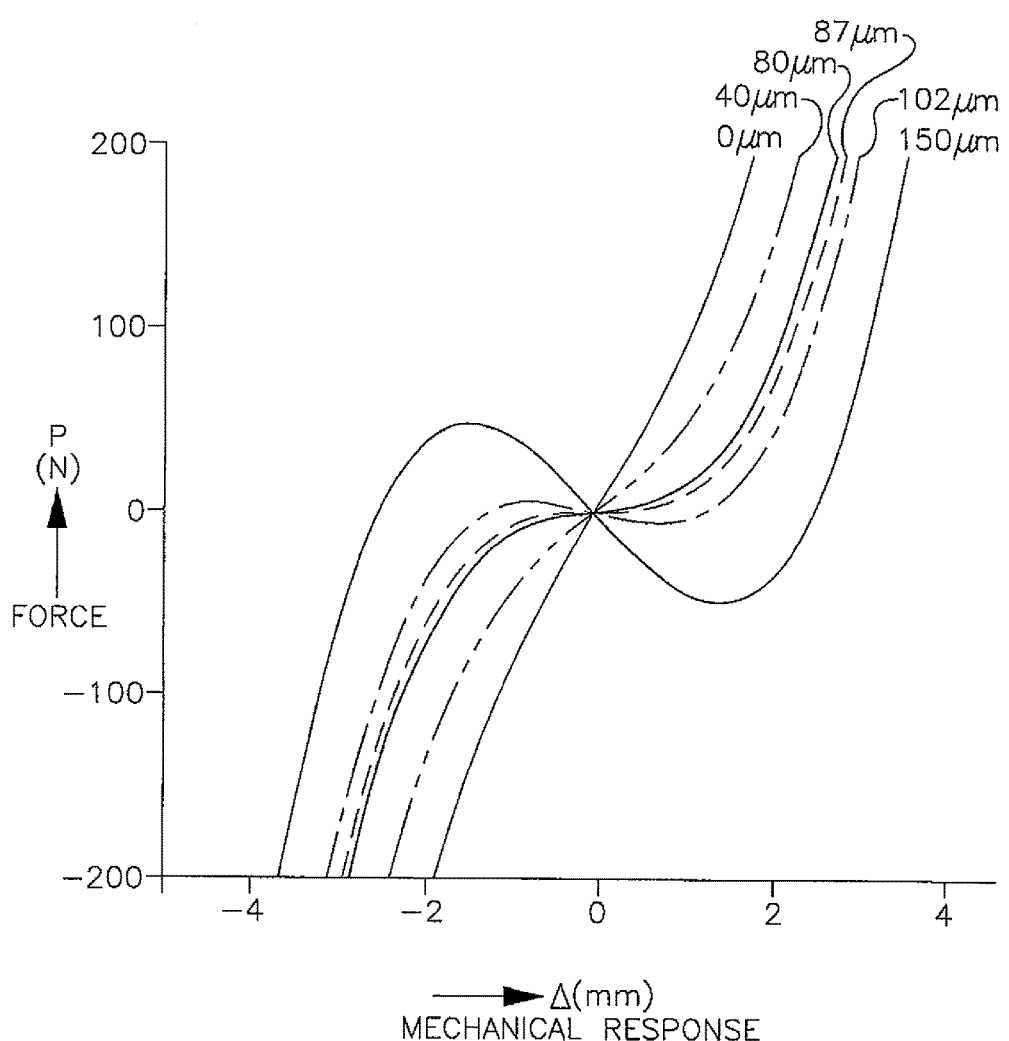
FIG. 7 is a graph illustrating the mechanical response of a variable stiffness structure according to one embodiment of the present disclosure over a range of different actuator positions.

FIG. 7 illustrates the simulated mechanical response of a variable stiffness structure for different actuator positions ranging from 0-150 microns. The simulated mechanical response illustrated in FIG. 7 was obtained by isolating a 5 kg mass on a variable stiffness structure configured similar to the variable stiffness structure 100 described above with reference to FIG. 2. In particular, the simulation was based on a 5 kg mass being supported on a center portion of a 10 cm long steel snap-through beam and a positive stiffness element coupled to the snap-through beam. FIG. 7 depicts the simulated mechanical response of the variable stiffness structure when the actuator (e.g., a piezoelectric active material) is actuated to compress one end of the negative stiffness element by approximately or about 0 µm, 40 µm, 80 µm, 87 µm, 102 µm, and 150 µm. As illustrated in FIG. 7, controlling the length of the actuator operatively coupled to one end of the beam from 0-150 microns changes the static response of the structure from an initial positive stiffness system (i.e., when the actuator is expanded by 0 µm and 40 µm), to a quasi-zero stiffness system (i.e., when the actuator is expanded by 80 µm, 87 µm, and 102 µm), and finally to a negative stiffness system (i.e., when the actuator is expanded by 150 µm). Accordingly, the variable stiffness structure for which a simulated mechanical response is shown in FIG. 7 is an example of a structure in which the negative stiffness element, the positive stiffness element, and the actuator are configured to provide a range of stiffnesses of the structure from substantially zero to a stiffness of the positive stiffness element by controlling the amount of negative stiffness of the negative stiffness element. Here, the actuator that is coupled to the negative stiffness element is configured to set one or more stiffnesses of the structure in the range from substantially zero to the stiffness of the positive stiffness element by changing the compression of the negative stiffness element.

Figure 8:
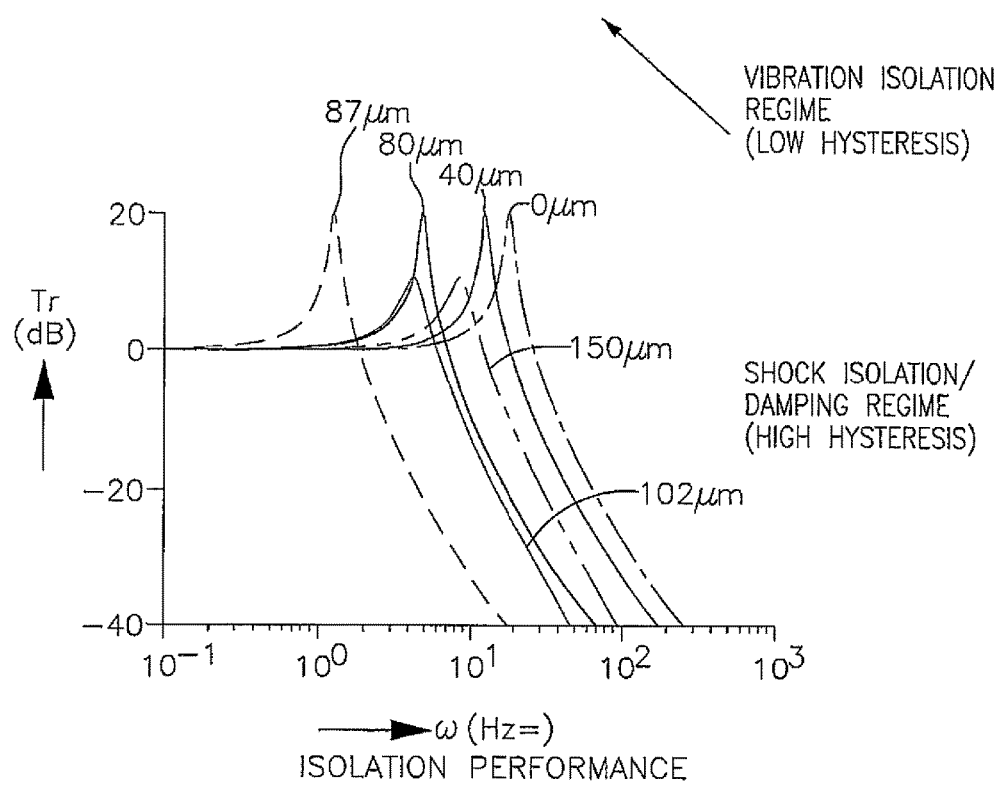
FIG. 8 is a graph illustrating the transmissibility of vibrations through a variable stiffness structure according to one embodiment of the present disclosure over a range of different actuator positions.

FIG. 8 illustrates the simulated transmissibility of vibrations through a variable stiffness structure similar to the variable stiffness structure 100 described above with reference to FIG. 2 for each of the actuator positions depicted in FIG. 7. In particular, FIG. 8 depicts the simulated transmissibility of the variable stiffness structure when the actuator (e.g., a piezoelectric active material), operatively coupled to one end of the negative stiffness element, has compressed the negative stiffness element by approximately 0 µm, 40 µm, 80 µm, 87 µm, 102 µm, and 150 µm. Transmissibility (Tr) is defined as the ratio of the response amplitude of the isolated mass supported by the variable stiffness structure to the excitation amplitude input into the variable stiffness structure or the isolated mass. In an embodiment, transmission ratio may be used as a measure of isolation quality (i.e., isolation can be defined as a prevention of transmission of vibration through a structure, e.g. between a mass and a base). In FIG. 8, resonance occurs when the transmissibility ratio exceeds approximately 10 and isolation begins when the transmissibility is less than 1. Additionally, transmission of vibrations through the structure can be isolated at any frequency above about twice the natural frequency of the system. Further, because the variable stiffness structure exhibits quasi-zero stiffness, in some embodiments, the natural frequency of the structure can be lowered more than can typically be achieved with a linear structure.

As illustrated in FIG. 8, the resonant frequency of the structure is approximately or about 20 Hz when the actuator is unexpanded (i.e., when the negative stiffness member is uncompressed by the actuator), approximately 15 Hz when the actuator has expanded to compress the negative stiffness member by 40 µm, approximately 5 Hz when the actuator has expanded to compress the negative stiffness member by 80 µm, approximately 1 Hz when the actuator has expanded to compress the negative stiffness member by 87 µm, approximately 4 Hz when the actuator has expanded to compress the negative stiffness member by 102 µm, and approximately 8 Hz when the actuator has expanded to compress the negative stiffness member by 150 µm. Accordingly, in this embodiment, natural frequency changes of greater than 10× can be obtained with relatively small actuator motions. Additionally, FIG. 8 illustrates that as the negative stiffness ($-k_2$) of the negative stiffness element is more closely tuned to match the positive stiffness ($k_1$) of the positive stiffness element (i.e., such that $k_1-k_2$ is zero or substantially zero), the natural frequency of the structure approaches 0. In an embodiment, the better the tuning between the positive stiffness ($k_1$) and the negative stiffness ($-k_2$), the lower the natural frequency of the structure and the better the isolation performance of the structure. Additionally, because the natural frequency (F) of the structure is defined as $$f = \frac{1}{2\pi}\sqrt{\frac{k}{m}}$$

it is apparent that the stiffness of the structure increases exponentially as the resonant frequency of the structure increases. For instance, the stiffness of the structure when the actuator is unexpanded and the nature frequency of the structure is approximately 20 Hz is approximately 400 times greater than the stiffness of the structure when the actuator has compressed the negative stiffness element by 87 µm such that the natural frequency of the structure is approximately 1 Hz.

Figure 9:
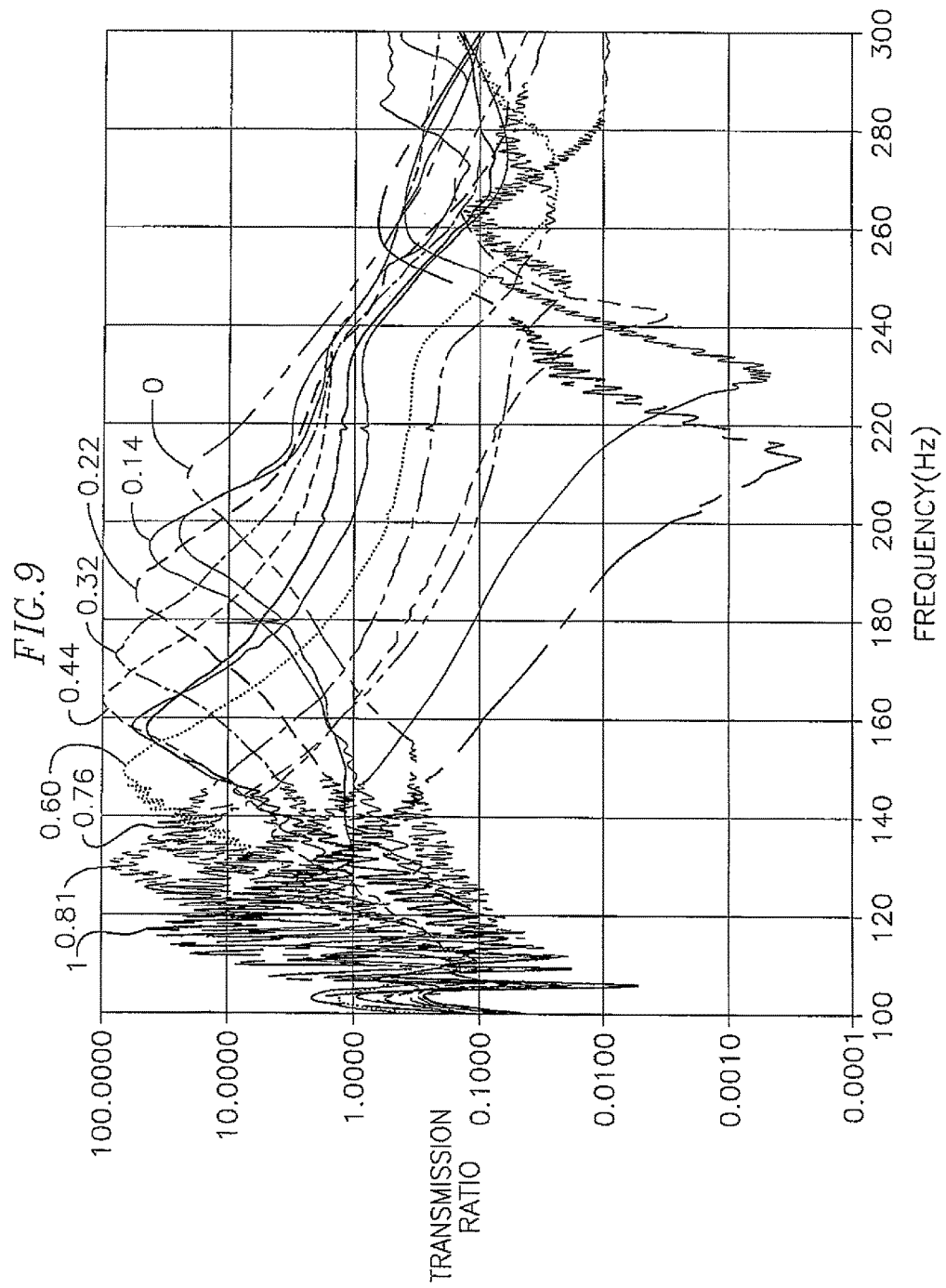
FIG. 9 is a graph illustrating the transmissibility of vibrations through a variable stiffness structure according to one embodiment of the present invention over a range of different actuator positions.

FIG. 9 illustrates the transmissibility of vibrations through an experimental setup of a variable stiffness structure similar to the variable stiffness structure 100 described above with reference to FIG. 2 when the actuator (e.g., a piezoelectric active material), operatively coupled to one end of the negative stiffness element, has compressed the negative stiffness element by a range of different amounts. FIG. 9 depicts the expansion or deflection of the actuator in normalized units ranging between 0 (i.e., the initial position of the actuator during the experiment) and 1 (i.e., the maximum expanded position of the actuator during the experiment). For instance, the line labeled "0.81" depicts the transmissibility of the variable stiffness structure over a range of frequencies when the actuator was expanded or displaced to approximately or about 81% of the maximum expansion or displacement of the actuator during this experiment, and the line labeled "0.14" depicts the transmissibility of the variable stiffness structure over a range of frequencies when the actuator was expanded to approximately 14% of the maximum expansion of the actuator during the experiment. Data nearing 100 Hz in this example of FIG. 9 is of lower quality due to limits of the experimental setup. As illustrated in FIG. 9, the natural frequency of the structure decreases from approximately 200 Hz when the actuator is in its initial position (e.g., approximately 0 µm) down to approximately 100 Hz when the actuator is in its maximum expanded position for the experiment (e.g., approximately 100 µm). Accordingly, displacement of the actuator on the order of 100 µm produces a nearly a 2× change in resonant frequency (i.e., a 4× change in stiffness). In some embodiments, vibration isolation is optimal when the input excitation frequency acting on the isolated mass is approximately 2× the resonant frequency of the structure. In some embodiments, the natural frequency of the structure may be controlled to be between approximately 0-½ the input frequency acting on the mass for which isolation is desired. There may also be off-axis stiffness considerations in which certain natural frequencies should be avoided. For example, in one embodiment, if there is a torsional structural mode at 120 Hz, it may be desired to either control the natural frequency of the structure below 100 Hz or above 140 Hz, and not allow the natural frequency to stay near 120 Hz for any length of time.

In one or more embodiments, the position of the actuator may be dynamically controlled at the same frequency as the excitation vibration input into the structure or the isolated mass such that different stroke and rebound deflection paths can be obtained. For example, providing negative stiffness (e.g., the curves in FIGS. 7 and 8 corresponding to the actuator deflection of 150 μm) during motion of the isolated 5 kg mass away from the center point and positive stiffness (e.g., the curves in FIGS. 7 and 8 corresponding to 0 μm actuator deflection) during motion toward the center point can create a variable-size hysteretic loop that can dissipate energy. In one embodiment, the dissipated energy may go into the actuator and becomes a basis for energy harvesting.

Figure 10:
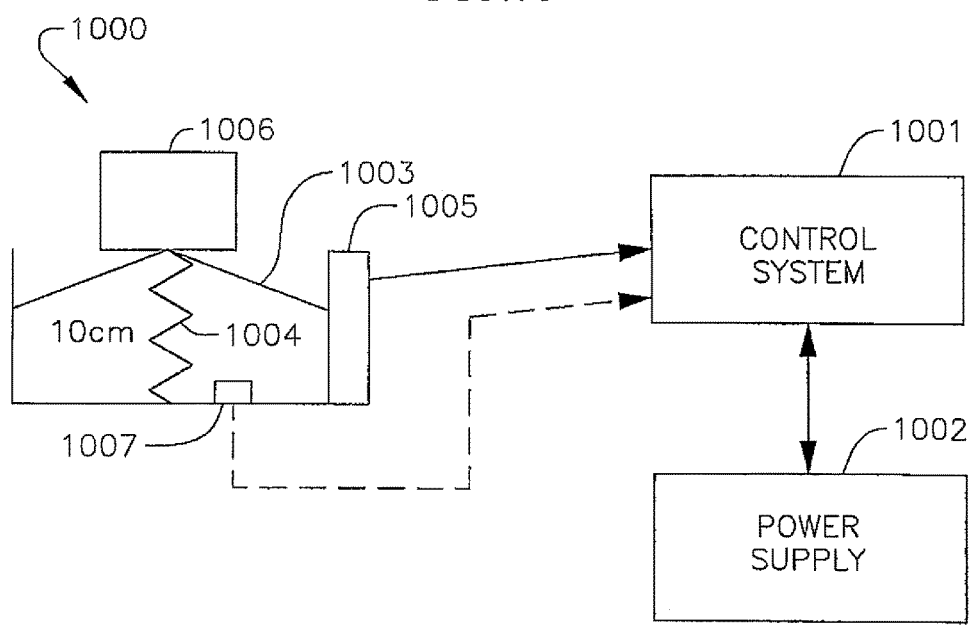
FIG. 10 is a schematic representation of a variable stiffness structure coupled to a power source and a control system configured to actively and dynamically change the stiffness of the variable stiffness structure according to one embodiment of the present disclosure.

FIG. 10 is a schematic illustration of a variable stiffness structure 1000 operatively connected to a control system 1001 and a power supply 1002 configured to actively control the negative stiffness of the variable stiffness structure 1000 based upon measured or detected conditions of the variable stiffness structure 1000. In the illustrated embodiment, the variable stiffness structure 1000 is similar to the configuration of the variable stiffness structure 100 described above with reference to FIG. 2 and includes a negative stiffness element 1003 (e.g., a snap-through beam), a positive stiffness element 1004 (e.g., a spring) coupled to the negative stiffness element 1003, and an actuator 1005 (e.g., a piezoelectric active material) operatively coupled to one end of the negative stiffness element 1003. The variable stiffness structure 1000 is configured to isolate a mass 1006 (e.g., a 5 kg mass) coupled to a center portion of the negative stiffness element 1003 from unwanted vibrations. In one or more embodiments, the control system 1001, the power supply 1002, and the actuator 1005 are configured to set the stiffness of the structure 1000 in the range from quasi-zero stiffness to the stiffness of the positive stiffness element 1004.

With continued reference to the embodiment illustrated in FIG. 10, one or more sensors 1007 are configured to measure or detect one or more conditions of the variable stiffness structure 1000, such as, for instance, a position of the mass 1006 and/or the negative stiffness element 1003, strain on the negative stiffness element 1003 and/or the positive stiffness element 1004, and/or the temperature of the variable stiffness structure 1000. Additionally, the sensors 1007 may be configured to measure or detect one or more conditions of the structure or system into which the variable stiffness structure 1000 is integrated. For instance, in an embodiment in which the variable stiffness structure 1000 is incorporated in a vehicle, the sensors 1007 may be configured to collect external information such as, for instance, engine rpms, velocity, braking, and steering inputs. The sensors 1007 may be any kind of sensors suitable for measuring or detecting the relevant conditions of the variable stiffness structure 1000, such as, for instance, position sensors (e.g., linear variable differential transformer (LVDT) sensors, optical sensors, and/or laser-based sensors), strain sensors, load cells (e.g., strain gauges in a Wheatstone bridge configuration) to provide load information for the positive stiffness element 1004 and/or the negative stiffness element 1003, and/or a temperature sensor to compensate for thermal effects. The one or more sensors 1007 are configured to send one or more signals to the control system 1001. Based upon the input received from the one or more sensors 1007, the control system 1001 is configured to send a command signal to the power supply 1002. The command signal from the control system 1001 adjusts the power supplied to the actuator 1005 to expand or contract the actuator 1005 and thereby adjust the negative stiffness of the variable stiffness structure 1000 based upon the input signal from the one or more sensors 1007. Accordingly, the sensors 1007, the control system 1001, the power supply 1002, and the actuator 1005 cooperative to actively control the stiffness of the variable stiffness structure 1000 based on one or more measured or detected conditions of the variable stiffness structure 1000 and/or the structure or system into which the variable stiffness structure 1000 is integrated.

In one or more embodiments, one or more sensors 1007 may be configured to measure the natural frequency or stiffness of the variable stiffness structure 1000 illustrated in FIG. 10. In one embodiment, the sensor 1007 configured to measure the natural frequency of the structure 1000 is an accelerometer on the isolated mass 1006. The accelerometer sensor 1007 is configured to send a signal to the control system 1001 and the control system 1001 is configured to send a command to the power supply 1002 to actuate the actuator 1005 in response to the natural frequency or stiffness of the structure 1000. In one embodiment, the control system 1001 is configured to perform a fast Fourier transform (FFT) on the input signal received from the accelerometer sensor 1007 over a particular time window (e.g., 2 seconds) and determine the natural frequency of the structure 1000 based upon the strongest peak in the transform. For example, in one embodiment, if there are 2 peaks in the transform, or if the peak is switching rapidly, this indicates instability (e.g., snap-through of the negative stiffness element 1003) and therefore the control system 1001 may send a command to the power supply 1002 to reduce the expansion of the actuator 1005 (i.e., reduce the compression of the negative stiffness element 1003) and thereby reduce the negative stiffness of the variable stiffness structure 1000. Further, in one embodiment, if the peak is stable, the control system 1001 may send a command to the power supply 1002 to increase the expansion of the actuator 1005 (i.e., increase the compression of the negative stiffness element 1003) until the peak reaches a desired (low) frequency (e.g., between the natural frequency of the positive stiffness element 1004/isolated mass 1006 and zero) or until the natural frequency reaches the limits of the given window (e.g. a 2 second window). In one embodiment, the control system 1001 may be configured to limit the structure 1000 to a minimum natural frequency, such as, for instance, down to approximately or about 0.5 Hz or approximately or about 2 Hz. System gains (i.e., how far to expand or contract the actuator 1005) can be determined by any suitable control system model, such as, for instance, sliding mode control (SMC), a proportional-integral-derivative (PID) controller algorithm, or skyhook-type algorithms. In one embodiment, an actuator with a closed loop controller can be used to hold the structure 100 at much lower frequencies, which may be limited only by the accuracy of the actuator 1005.

The actuator 1005 may be any suitable kind of actuator depending on the desired level of precision and/or speed for controlling the amount of negative stiffness of the variable stiffness structure 1000, such as, for instance, active materials (e.g., piezoelectric materials, shape memory alloys, magnetostrictive materials, electro-active polymers, and dielectric elastomers), servo motors, stepper motors, solenoids, ultrasonic drives, voice coils, hydraulics, wedges, levers, or tapered shafts. In one or more embodiments, the kinds of suitable power supply 1002 depends on the kind of actuator 1005 used.

The control system 1001 may be any suitable kind of controller configured to receive one or more input signals from the sensors 1007 and send a command signal to the power supply 1002 to dynamically change the stiffness of the variable stiffness structure 1000. For instance, in one embodiment, the control system 1001 may include hardware components (e.g., processors, controllers, and/or logic) to implement one or more of the described operations of the control system 1001. In some embodiments, code such as software or firmware executing on one or more processing devices may be used to implement one or more of the described operations of the control system 1001. Additionally, in some embodiments, software may be used to control actuation of the actuator 1005 and thereby control the amount of negative stiffness of the variable stiffness structure 1000. Any suitable kind of software algorithm may be used, such as, for instance, a proportional-integral-derivative (PID) controller algorithm or skyhook-type algorithms. Such software can provide approach feedback in dynamic loading situations.

Figure 11:
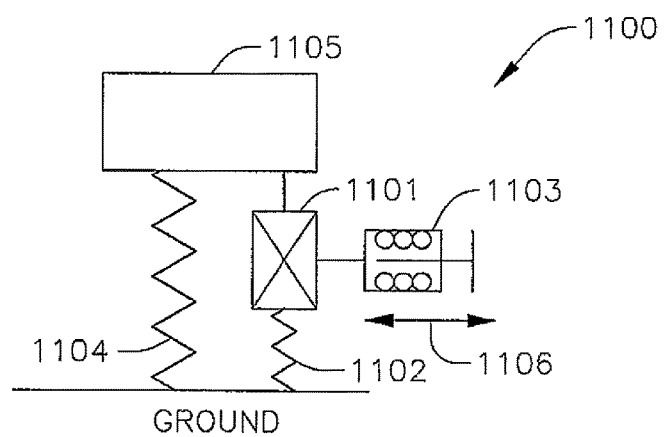
FIG. 11 is a schematic diagram showing coupling of an actuator with a sensitive geometric point of a nonlinear structure, which allows control of a degree of nonlinearity according to an embodiment.

With reference now to FIG. 11, a variable stiffness structure 1100 according to another embodiment of the present disclosure includes a negative stiffness element 1101, a first positive stiffness element 1102 coupled to the negative stiffness element 1101, an actuator 1103 operatively coupled to the negative stiffness element 1101, and a second positive stiffness element 1104. Together, the negative stiffness element 1101 and the first and second positive stiffness elements 1102, 1104 are configured to isolate a mass 1105 from unwanted vibrations. The actuator 1103 is configured to be actuated (arrow 1106) between a plurality of different positions to control the stiffness of the negative stiffness element 1101. In one embodiment, the variable stiffness structure 1100 is the same as the variable stiffness structure 100 described above with reference to FIG. 2, except the variable stiffness structure 1100 includes the additional positive stiffness element 1104 coupled to support the mass 1105. Additionally, in the illustrated embodiment, the first positive stiffness element 1102 is connected in series to the negative stiffness element 1101 and both the first positive stiffness element 1102 and the negative stiffness element 1101 are operating in parallel with the second positive stiffness element 1104. Accordingly, the negative stiffness element 1101 is both in parallel and in series. In this configuration, both damping and stiffness of the structure 1100 can be controlled. In particular, actuation of the actuator 1103 changes the stiffness of the negative stiffness element 1101 and can thereby switch the variable stiffness structure 1100 between relatively high stiffness, quasi-zero stiffness, and hysteretic stiffness (i.e., damping). High stiffness can be used in a transmission of low-frequency inputs with minimal lag. In a QZS mode, the structure 1100 can isolate the mass 1105 from unwanted vibrations. In one embodiment, the variable stiffness structure 1100 can have a natural frequency which is approximately 10 times lower than passive linear isolation systems, while maintaining the ability to increase stiffness to a structural level if desired. One skilled in the art will understand that higher order structures can be built, e.g., from arbitrarily large networks of passive positive and controllable negative stiffness elements (e.g. springs).

Figure 12B:
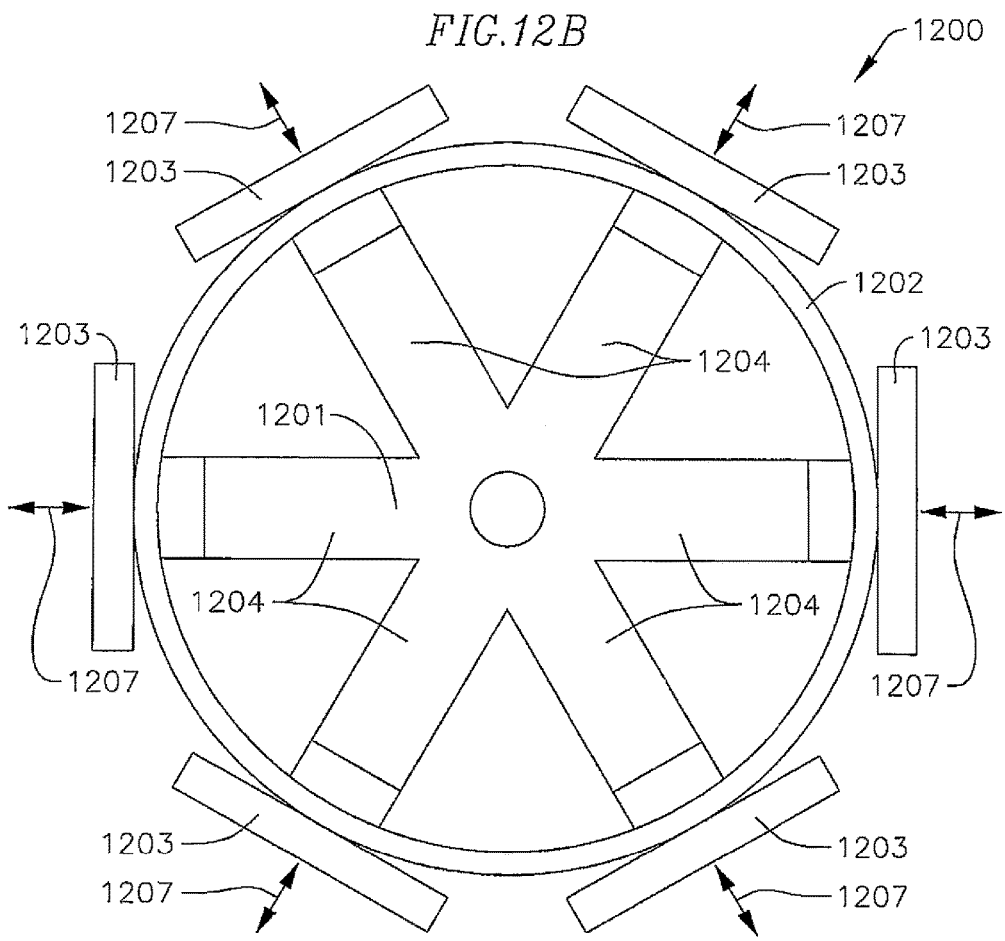
Figure 12C:
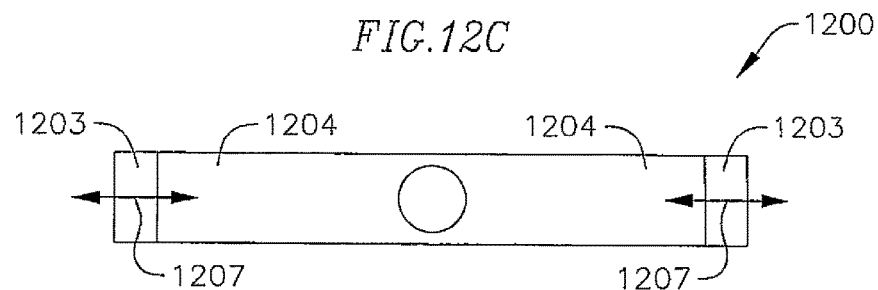

With reference now to FIGS. 12A-14C, variable stiffness structures according to further embodiments of the present disclosure are illustrated. The negative stiffness elements of the embodiments of the variable stiffness structure illustrated in FIGS. 12A-14C are described in more detail in U.S. Provisional Application No. 61/778,213, entitled "Short-Beam Negative Stiffness Elements," the entire content of which is incorporated herein by reference. With reference now to FIG. 12A, a variable stiffness structure 1200 includes a negative stiffness element 1201, an outer ring 1202 encircling the variable stiffness element 1201, and one or more actuators 1203 operatively coupled to the outer ring 1202. Although in the illustrated embodiment, the variable stiffness structure 1200 includes three actuators 1203, in one or more alternate embodiments, the variable stiffness structure 1200 may include any other suitable number of actuators 1203. In the illustrated embodiment, the negative stiffness element 1201 includes four arms 1204 extending radially outward from a central portion 1205, although in one or more alternate embodiments, the negative stiffness element 1201 may have any other suitable configuration, such as, for instance, two arms 1204 (FIG. 12C) or six arms 1204 (FIG. 12B). Additionally, in the illustrated embodiment, the central portion 1205 of the negative stiffness element 1201 is inwardly or outwardly deflected. The central portion 1205 is connected to the arms 1204 by a plurality of angled segments 1206. The negative stiffness element 1201 may be formed by any suitable process, such as, for instance, buckling an initially flat plate by applying a radially inward force, such as with an outer clamp, as described in U.S. Provisional Application No. 61/778,213.

Figure 13A:
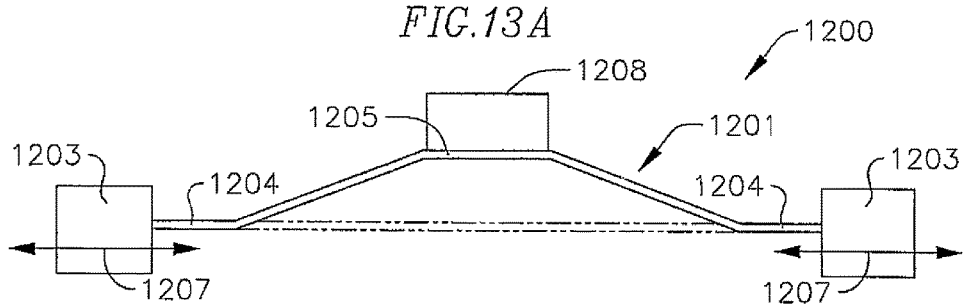
FIGS. 13A and 13B illustrated the variable stiffness structures of FIGS. 12A-12C being deflected between an upper stable position, an unstable flat position, and a lower stable position.
Figure 13B:
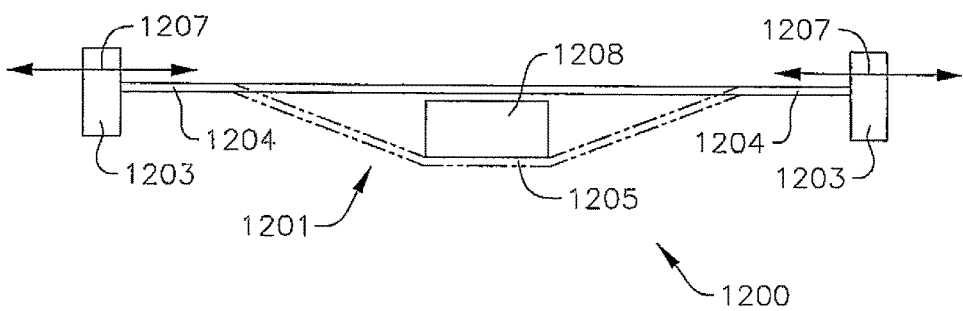

With reference now to FIG. 13A, the negative stiffness element 1201 is configured to exhibit positive stiffness between an upper stable state (shown in solid lines) and a flat, unstable position (shown in dashed lines). As the negatives stiffness element 1201 is deformed towards the unstable flat position (dashed lines in FIG. 13A), the force resisting this deformation decreases until the negative stiffness element 1201 is in the unstable flat position, at which point the force is reduced to zero. With reference now to FIG. 13B, as the negative stiffness element 1201 is deformed past the unstable flat position (shown in solid lines), the negative stiffness element 1201 will "snap" to a lower stable position (shown in dashed lines). Accordingly, within an envelope defined or bounded by the flat unstable position and the lower stable position, the variable stiffness structure 1200 exhibits negative stiffness (i.e., negative stiffness is generated during snap through between the unstable flat position and the lower stable position illustrated in FIG. 13B). As the negative stiffness element 1201 is deformed beyond the lower stable position, the negative stiffness element 1201 will again exhibit positive stiffness. Accordingly, the variable stiffness structure 1200 exhibits non-linear stiffness. The one or more actuators 1203 may each be actuated (arrow 1207) to radially compress or elongate the negative stiffness element 1201 and thereby increase or decrease, respectively, the amount of negative stiffness of the variable stiffness structure 1200. In the illustrated embodiment, the variable stiffness structure 1201 is configured to isolate an object or structure 1208 coupled to the central portion 1205 of the negatives stiffness element 1201 from unwanted vibrations.

Figure 14A:
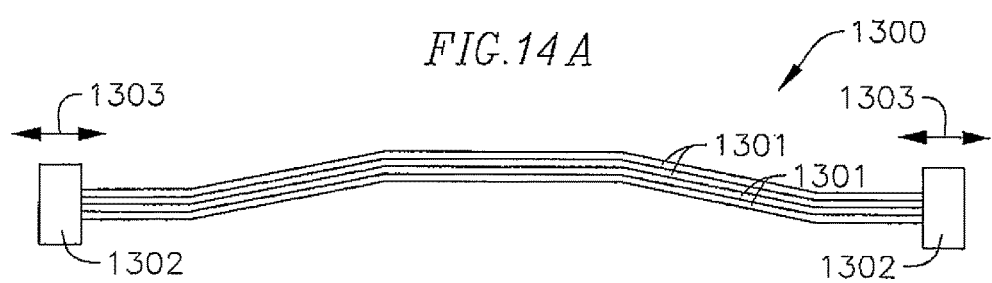
FIGS. 14A-14C are schematic representations of variable stiffness structures according to embodiments of the present disclosure including a plurality of stacked negative stiffness elements.
Figure 14B:
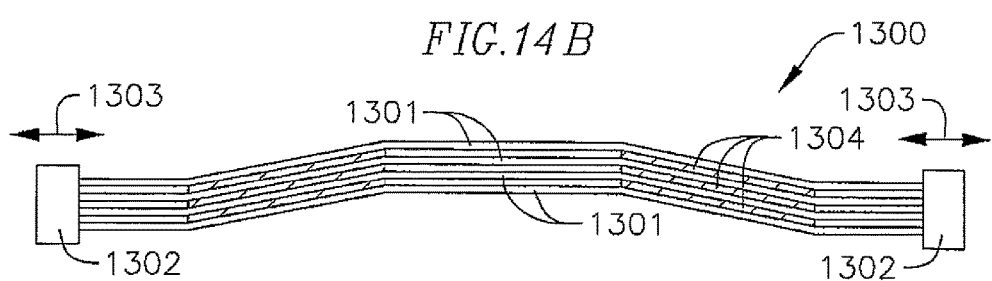
Figure 14C:
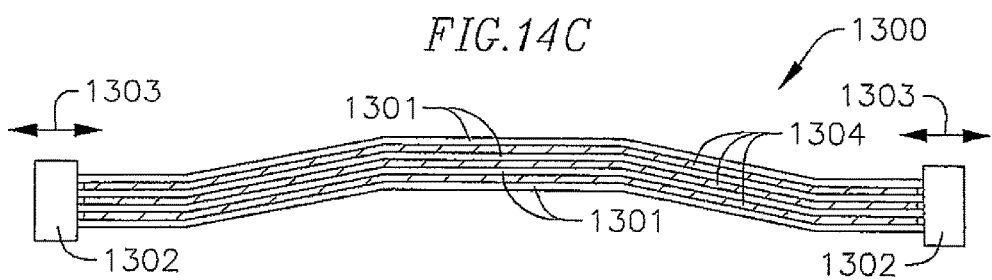

As illustrated in FIGS. 14A-14C, variable stiffness structures according to further embodiments of the present disclosure may include a plurality of stacked negative stiffness elements. In the embodiment illustrated in FIG. 14A, a variable stiffness structure 1300 includes three stacked negative stiffness elements 1301, although in one or more alternate embodiments, the variable stiffness structure 1300 may include any other suitable number of negative stiffness elements 1301 depending on the desired range of stiffnesses of the variable stiffness structure 1300. In one embodiment, each of the negative stiffness elements 1301 may be the same or similar to the negative stiffness element 1201 described above with reference to FIGS. 12A-13B. The variable stiffness structure 1300 also includes one or more actuators 1302 that can be actuated (arrow 1303) to radially compress or elongate the stack of negative stiffness elements 1301 and thereby increase or decrease, respectively, the amount of negative stiffness of the variable stiffness structure 1300. Additionally, in the embodiment illustrated in FIG. 14A, the negative stiffness elements 1301 are stacked directly on top of each other, although in one or more alternate embodiments, the variable stiffness structure 1300 may include spacers 1304 between adjacent negative stiffness elements 1301. The spacers 1304 may either extend over only a portion of the negative stiffness elements 1301 (FIG. 14B) or over the entire area or substantially the entire area of the negative stiffness elements 1301 (FIG. 14C).

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" another component, it can be directly on the other component or components may also be present therebetween. Moreover, when a component is component is referred to as being "coupled" to another component, it can be directly attached to the other component or intervening components may be present therebetween.

What is claimed is:

1. A vehicle, comprising:
   a vibration isolation system comprising:
   at least one variable stiffness structure, the at least one variable stiffness structure comprising:
   a negative stiffness element; and
   an actuator operatively coupled to the negative stiffness element to control a stiffness of the negative stiffness element; and
   a payload supported on the negative stiffness element; and
   a first sensor coupled to the actuator, the first sensor configured to measure one or more dynamic conditions of the vehicle external to the vibration isolation system, the one or more dynamic conditions of the vehicle measured by the first sensor is selected from the group consisting of engine rpms, velocity of the vehicle, braking input, and steering input, and wherein the actuator is configured to make an adjustment to the stiffness of the negative stiffness element based on the one or more dynamic conditions of the vehicle measured by the first sensor, the adjustment isolating the payload from unwanted vibrations.

2. The vehicle of claim 1, wherein:
   the negative stiffness element comprises at least one beam having a buckling mode number of one,
   the actuator is configured to move between an expanded position and a contracted position directly connected to an end of the negative stiffness element to control the stiffness of the negative stiffness element, the actuator displacing the end of the negative stiffness element when the actuator moves between the expanded and contracted positions,
   the actuator is selected from the group consisting of a linear motor and an active material for fine-tuning the stiffness of the negative stiffness element, and
   the negative stiffness element is configured to move between an unloaded state and a loaded state, and wherein at least a portion of the negative stiffness element is parallel to the actuator in the unloaded state.

3. The vehicle according to claim 2, further comprising a positive stiffness element coupled to the negative stiffness element.

4. The vehicle according to claim 3, wherein:
   the negative stiffness element, the positive stiffness element, and the actuator are configured to provide a range of stiffnesses of the at least one variable stiffness structure in a range from substantially 0 to a positive stiffness of a combination of the negative stiffness element, the positive stiffness element, and the actuator; and
   the actuator coupled to the negative stiffness element is configured to set one or more stiffnesses of the at least one variable stiffness structure in the range from substantially 0 to the positive stiffness of the combination of the negative stiffness element, the positive stiffness element, and the actuator.

5. The vehicle according to claim 3, wherein the positive stiffness element is a linear spring in parallel with the negative stiffness element.

6. The vehicle according to claim 3, further comprising a linear spring in series with the negative stiffness element configured to control hysteretic damping.

7. The vehicle according to claim 2, wherein the negative stiffness element is in compression with the actuator at the end of the negative stiffness element.

8. The vehicle according to claim 2, wherein the at least one beam is uniform in thickness, and wherein the negative stiffness element stores energy during snap through of the negative stiffness element between a first stable position and a second stable position.

9. The vehicle according to claim 2, wherein the at least one beam is non-uniform in thickness and wherein end portions of the at least one beam have a lower stiffness than a central portion of the at least one beam.

10. The vehicle according to claim 9, wherein the end portions comprise at least one of a flexure, a pivot, or a bearing.

11. The vehicle according to claim 2, wherein the negative stiffness element comprises a radial arrangement of beams between an inner shaft and an outer ring, and wherein the negative stiffness element is configured for torsional snap-through negative stiffness.

12. The vehicle according to claim 11, wherein the actuator is configured to change a diameter of at least one of the inner shaft or the outer ring to control the negative stiffness of the negative stiffness element.

13. The vehicle according to claim 2, wherein the active material is one or more selected from the group consisting of a piezoelectric material, an electro-active polymer, a magnetostrictive material, and a shape memory alloy.

14. The vehicle according to claim 2, further comprising a second sensor coupled to the actuator, wherein:
   the second sensor is configured to detect at least one condition of the negative stiffness element, the at least one condition being different than the one or more dynamic conditions of the vehicle measured by the first sensor, and
   the actuator is configured to control the stiffness of the negative stiffness element according to the at least one detected condition of the negative stiffness element.

15. The vehicle according to claim 14, further comprising one or more additional sensors.

16. The vehicle according to claim 14, wherein the second sensor is configured to utilize a closed-loop control to sense at least one of instantaneous stiffness of the structure and excitation frequency.

17. The vehicle according to claim 2, wherein the at least one variable stiffness structure comprises a plurality of actuators.

18. The vehicle according to claim 17, wherein at least one actuator of the plurality of actuators is configured to control at least one other actuator of the plurality of actuators.

19. The vehicle according to claim 2, wherein the actuator comprises a first actuator and a second actuator, wherein the first actuator is a different kind of actuator from the second actuator.

20. The vehicle according to claim 19, wherein the first actuator has a different frequency response or a different displacement range from the second actuator.

21. The vehicle according to claim 1, wherein the at least one variable stiffness structure comprises at least two variable stiffness structures arranged in series and/or in parallel.

22. The vehicle according to claim 1, wherein the at least one variable stiffness structure is configured to provide a preload compensation, transfer energy, dissipate energy, harvest energy, and/or store energy.

* * * * *